United States Patent
Kuwata et al.

[11] Patent Number: 6,055,071
[45] Date of Patent: *Apr. 25, 2000

[54] IMAGE FORMING APPARATUS

[75] Inventors: Kazumi Kuwata, Tokyo; Kouji Hayashi, Kanagawa, both of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/854,111

[22] Filed: May 9, 1997

[30] Foreign Application Priority Data

| May 10, 1996 | [JP] | Japan | 8-116723 |
| Nov. 8, 1996 | [JP] | Japan | 8-296542 |
| Apr. 25, 1997 | [JP] | Japan | 9-109257 |

[51] Int. Cl.$^7$ .................................................. H04N 1/00
[52] U.S. Cl. ............................................ 358/501; 358/521
[58] Field of Search .................................. 358/518, 443, 358/523, 520, 455, 501; 382/169, 167

[56] References Cited

U.S. PATENT DOCUMENTS

| 5,194,945 | 3/1993 | Kadowaki et al. | 358/520 |
| 5,508,826 | 4/1996 | Lloyd et al. | 358/501 |
| 5,585,927 | 12/1996 | Fukui et al. | 358/523 |
| 5,754,683 | 5/1998 | Hayashi et al. | 358/518 |
| 5,764,378 | 6/1998 | Oda et al. | 358/443 |
| 5,767,991 | 6/1998 | Hara | 358/518 |

FOREIGN PATENT DOCUMENTS

| 0 674 429 A2 | 9/1995 | European Pat. Off. |  |
| 0 685 962 A2 | 12/1995 | European Pat. Off. |  |
| 63-208370 | 8/1988 | Japan . |  |
| 63-303370 | 12/1988 | Japan . |  |
| 5-114962 | 5/1993 | Japan | H04N 1/00 |
| 7-193686 | 7/1995 | Japan . |  |
| 7-298075 | 11/1995 | Japan . |  |

*Primary Examiner*—Yon J. Couso
*Attorney, Agent, or Firm*—McDermott, Will & Emery

[57] ABSTRACT

An image forming apparatus according to the present invention comprises a scanner for optically scanning and reading a draft image, an image processing circuit for converting input image signals from this scanner to output image signals by referring to an image signal conversion table and outputting the converted signals, a laser optical system for writing image information on a photosensitive drum in response to the output image signals, developing units for forming images with toner, an image signal generating means for generating a plurality of gradation patterns, and a CPU which prepares and selectors an image signal conversion table according to read signals for gradation patterns read by the scanner; wherein a read signal for a gradation pattern comprises a plurality of signals with different spectral sensitivity respectively, and said image forming apparatus has a RAM to store calibration factors for the plurality of factors with different spectral sensitivity respectively and calibrates read signals according to a calibration factor from the RAM.

12 Claims, 27 Drawing Sheets

PREPARATION OF GRADATION CONVERSION CURVE

| SP MODE ⟨MENU⟩ | SCREEN SWITCHING | | CONTENTS |

| 4 | INFORMATION FOR SP SPECIFIC SPECIFICATIONS  PAGE 10
RGB CALIBRATION COEFFICIENT

|   | R | | B |
|---|---|---|---|
| K | 1.00 | 1.00 | 1.00 |
| C | 1.05 | 1.00 | 0.95 |
| M | 1.00 | 1.00 | 1.00 |
| Y | 1.00 | 1.00 | 0.95 |

PREVIOUS PAGE | NEXT PAGE

305

IMAGE FORMING APPARATUS

FIELD OF THE INVENTION

The present invention relates to an image forming apparatus such as a copying machine, a printer, and a facsimile machine each based on a digital system.

BACKGROUND OF THE INVENTION

Conventionally, in an image forming apparatus based on a digital system, an image signal conversion table (look up table: described as "LUT" hereinafter) has been used to correct output characteristics of an output device (an image forming means) such as a printer or to emphasize a particular density area. This image forming apparatus generally comprises an image reading means, an image processing means, an image writing means, and an image forming means, and the LUT described above is incorporated in the image processing means, converts an input image signal inputted from the image reading means into the image processing means and outputs the converted signal as an output image signal to the image writing means.

On the other hand, the LUT is made reflecting output characteristics for image density of an image forming means such as a printer, so that, in a case where output characteristics of the printer has changed because of degradation or contamination of the image forming means or the like, the LUT can not play a role for calibration.

To overcome the defect, as one of controls called process controls executed inside an image forming apparatus, a plurality of patterns each having different image density are formed on an image carrier such as a photosensitive body or a transfer body; the patterns are detected by an optical sensor by checking the reflected light or transmitted light to change charged potential, development bias, or an exposure to a laser beam according to a result of detection, or to correct a gradation calibration table for gradation conversion for image data.

This calibrating method provides the merits that it enables automatic calibration within an image forming apparatus and that intervention by an operator is not required, but because of the characteristics of the optical sensor, there is no change in the side of high density where a quantity of deposited toner is large, so that calibration is possible only in a range from low density to intermediate density where a quantity of deposited toner is small. Further it is impossible to correct a quantity of toner which fluctuates according to change in a transfer capability of a transfer section associated with passage of time or to correct fluctuation of image density caused by change in fixing capability of a fixing section.

In contrast, there has also been proposed a calibrating method in which a pattern image formed on an image carrier and transferred and fixed on a transfer member is read with a scanner and a gradation calibration table is selected or prepared according to the read data, or color conversion coefficients and an RGB-YMCK color conversion table are prepared. In this method, different from the calibrating method using an optical sensor as described above, intervention by an operator such as mounting a discharged transfer member onto a document base is required, but calibration of a high image density section where a quantity of deposited toner is large is possible, and there is provided the merit that change of image density due to change of fixing capability in the fixing section can be calibrated. As the calibrating method as described above, there has been known, for instance, the invention disclosed in Japanese Patent Laid-Open Publication No. HEI 5-114962.

On the other hand, in a scanner used in an image forming apparatus like a color copying machine, because of change during passage of time in spectral sensitivity of an RGB filter in a CCD (Charge Coupled Device) constituting the scanner or because of difference of spectral sensitivity in each image forming apparatus, even if the same color patch pattern or a gradation pattern is read, a value read by each scanner may vary from unit to unit. Description is made below for this phenomenon with reference to FIG. 32 showing non-uniformity of spectral transmission characteristic of a B (Blue) filter in a CCD.

In FIG. 32, a) indicates a spectral transmission factor of a B filter 1 in a CCD, b) indicates a spectral transmission factor of a B filter 2 in the CCD, c) indicates a spectral transmission factor of yellow (Y) toner, and d) indicates a spectral transmission factor of black (K) toner in a case where a quantity of deposited toner is small. The horizontal axis indicates a wavelength, while the vertical axis indicates a spectral transmission factor or a spectral reflection factor of the CCD. In this figure, a) and b) show an example of non-uniformity in a spectral transmission factor of the B filter. Herein it is assumed that the spectral transmission factors a) and b) have been shifted by a rate indicated at h) respectively, but the same consideration is applicable also to a case where the assumption as described above is not made.

Namely, comparing the light transmitted through the B filter 1 in a) to the light transmitted through the B filter 2 in b) under the spectral reflection factor d) of black toner in a case where a quantity of deposited toner is small, a quantity of light having transmitted through the filter B1 is larger by a quantity of light having transmitted through a region e), but is smaller by the light having transmitted through regions f) and g) as compared to a quantity of light having transmitted through the filter B2. Herein the spectral characteristics in a) and b) have been shifted by a rate in h) respectively, in a case of the light having transmitted through the B filter 1 in a), the quantity of light having transmitted through the region e) is equal to the quantity of light blocked by the regions f) and g), and for this reason a difference for a Blue signal between a) and b) is small as far as the black toner is concerned.

To strictly examine the different above, it is necessary to take into considerations the spectral characteristics of the light source and dependency of sensitivity of a CCD on wavelength, but when calibrating shading of a scanner, by using an achromatic-colored reflection plate with low dependency of a spectral reflection factor for instance in gray on wavelength in a visible light area, the difference between a) and b) is calibrated.

However, in a case of yellow (Y) toner, the difference between filters in a) and b) appears as a difference of light having transmitted through or having been blocked by the region g), and the difference is clearly larger than that in a case of black toner. Also the difference can not be calibrated even by a shading calibration using an achromatic-colored reflection plate. The non-uniformity in spectral transmission factors among filters in a CCD can be calibrated in a case of achromatic colors like white or gray by means of shading calibration so that the RGB data become uniform, but in a case of a document with a spectral characteristic dependent on wavelength, the calibration can not be executed appropriately, and sometimes values for R, G, and B may vary unit by unit.

The difference generates some influences when reading transfer paper with a gradation pattern of each color YMCK or color patch recorded thereon with a scanner and preparing a gradation calibration table (γ-calibration table) to correct gradation characteristics of a printer section from the read values (this operation is called Auto Color Calibration, and is described as ACC hereinafter), and offset from an idealistic state causes this phenomenon. Also in a case where the spectral transmission characteristic changes due to change of performance of a scanner in a CCD during passage of time, or in a case where the spectral reflection characteristics of YMCK toner being used changes, an RGB ratio in read values for the YMCK toner changes. As described above, if calibration is performed, after change of an RGB ratio in values read by a scanner for the YMCK toner, with an RGB ratio before the change, offset from a correct value becomes rather larger.

SUMMARY OF THE INVENTION

It is a first object of the present invention to provide an image forming apparatus in which density of toner set after execution of ACC due to non-uniformity in spectral characteristics of a CCD in a scanner does not change for each apparatus and which can obtain good gradation by means of calibration.

It is a second object of the present invention to provide an image forming apparatus in which calibration can be carried out with an appropriate value even in a case where the spectral transmission characteristic changes due to change of performance of a CCD in a scanner during passage of time, or in a case where the spectral reflection character of used YMCK toner changes.

It is a third object of the present invention to provide an image forming apparatus in which a calibration value can easily be set.

It is a fourth object of the present invention to provide an image forming apparatus in which, by setting data for calibration of non-uniformity in spectral sensitivity among CCDs of discrete apparatuses with an external means, the non-uniformity can be calibrated by connecting this external means thereto.

It is a fifth object of the present invention to provide an image forming apparatus in which a calibration value can easily be set against change in spectral transmission characteristic of a CCD or in spectral reflection characteristic of YMCK toner.

An image forming apparatus according to the present invention comprises a scanner for optically scanning and reading a draft image, an image processing circuit for converting input image signals from this scanner to output image signals by referring to an image signal conversion table and outputting the converted signals, a laser optical system for writing image information on a photosensitive drum in response to the output image signals, developing units for forming images with toner, an image signal generating means for generating a plurality of gradation patterns, and a CPU which prepares and selectors an image signal conversion table according to read signals for gradation patterns read by the scanner; wherein a read signal for a gradation pattern comprises a plurality of signals with different spectral sensitivity respectively, and said image forming apparatus has a RAM to store calibration factors for the plurality of factors with different spectral sensitivity respectively and calibrates read signals according to a calibration factor from the RAM.

Other objects and features of this invention will become understood from the following description with reference to the accompanying drawings.

BRIEF DESCRIPTION OF THE DRAWINGS

FIG. 19 is a plan view showing a liquid-crystal display screen of the operating section for displaying RGB calibration data;

DESCRIPTION OF THE PREFERRED EMBODIMENTS

Description is made hereinafter for embodiments, in which a case where the image forming apparatus according to the present invention is applied to an electronic photo copying machine (described simply as a copying machine hereinafter) is assumed as an example, with reference to the related drawings.

Figure 2:
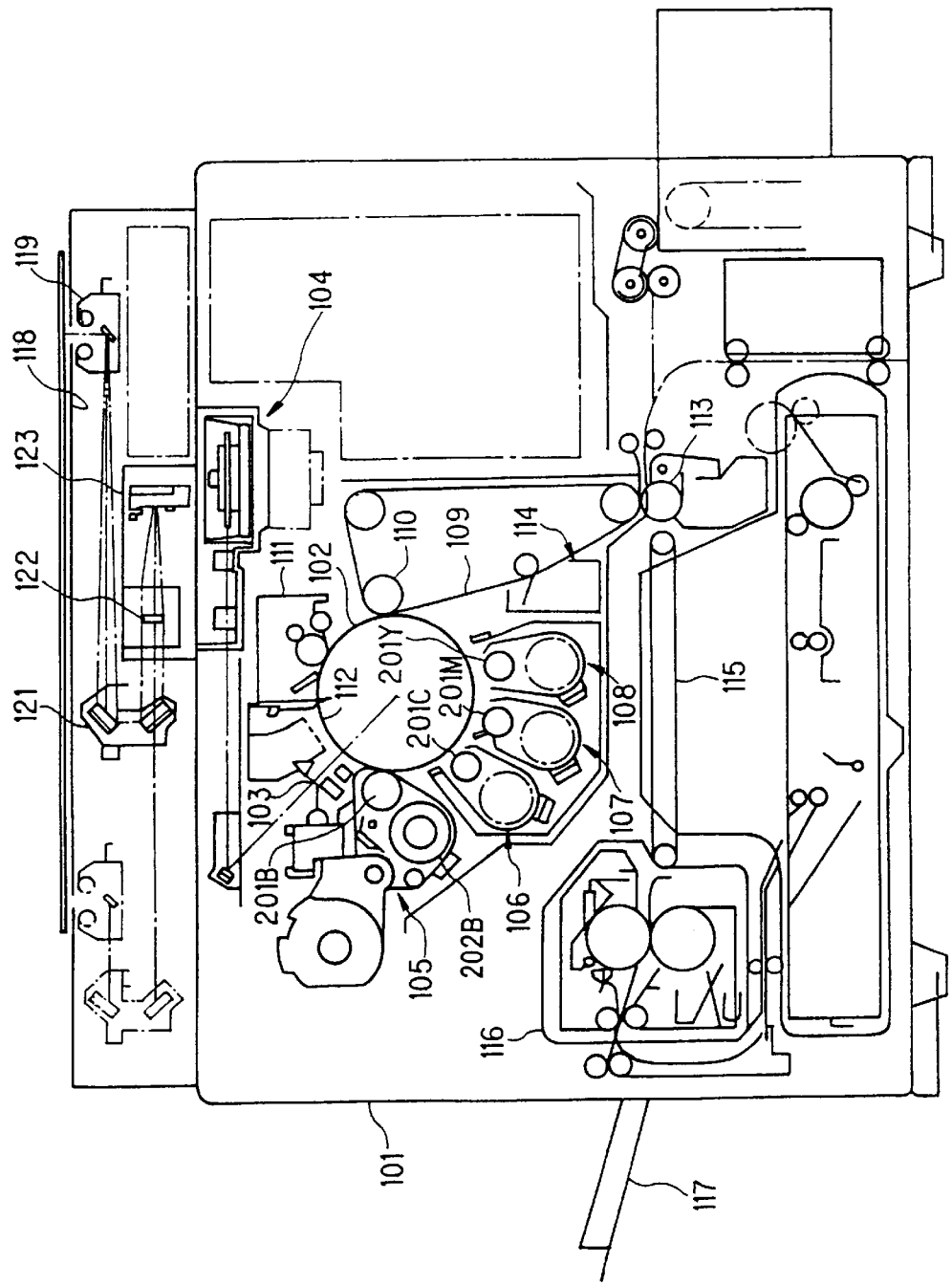
FIG. 2 is an organizational view showing an outline of a mechanism of the main body of a copying machine according to Embodiment 1.

At first, description is made for a first embodiment of the present invention. FIG. 2 is a schematic view showing mechanical configuration of the main body of a copying machine according to the first embodiment.

In FIG. 2, successively arranged in the periphery of an organic photosensitive (OPC) drum 102 having a diameter of 120 mm as an image carrier provided in substantially the center of the main body of the copying machine 101 are an electrifying charger 103 for electrifying the surface of this photosensitive drum, a laser optical system 104 for irradiating the surface of the uniformly electrified photosensitive drum 102 with a semiconductor laser beam to form an electrostatic latent image, a black-developing device 105 for supplying toner for each color to the electrostatic latent image to be developed and obtaining each toner image in each color, three types of developing device 106, 107, 108 for yellow Y, magenta M, and cyan C, an intermediate transfer belt 109 for successively transferring the toner images in each of the colors formed on the photosensitive drum 102, a bias roller 110 for applying a transfer voltage to this intermediate transfer belt 109, a cleaning device 111 for removing toner residues on the surface of the photosensitive drum 102 after the toner image is transferred onto transfer paper, and a charge-removing section 112 for removing charge residues on the surface of the photosensitive drum 102 after the toner image is transferred thereonto. Provided therein are also a transfer bias roller 113 for applying a voltage for transferring the toner image transferred along the intermediate transfer belt 109 onto transfer paper and a belt cleaning device 114 for cleaning the image of toner residues on the intermediate transfer belt 109 after the toner image is transferred onto the transfer paper.

A fixing device 116 for fixing the toner image by being heated or pressured is provided in the exit side of an edge section of a transfer belt 115 for transferring transfer paper peeled from the intermediate transfer belt 109 after the toner image on the intermediate transfer belt 109 is transferred thereonto, and a paper feeder tray 117 is also attached to the exit section of this fixing device 116.

A contact glass 118 as a document base arranged on the top section of the main body of a copying machine 101 and an exposing lamp 119 for irradiating a document on this contact glass 118 with scanning light are provided in the upper side of the laser optical system 104, and a reflected light from the document is led to an image-formation lens 122 by a reflecting mirror 121 to be introduced into an image sensor array 123 of a CCD as a photoelectric transfer element. Image signals converted to electric signals in the image sensor array 123 of a CCD oscillate a semiconductor laser in the laser optical system 104 through the image processing apparatus not shown herein.

Figure 3:
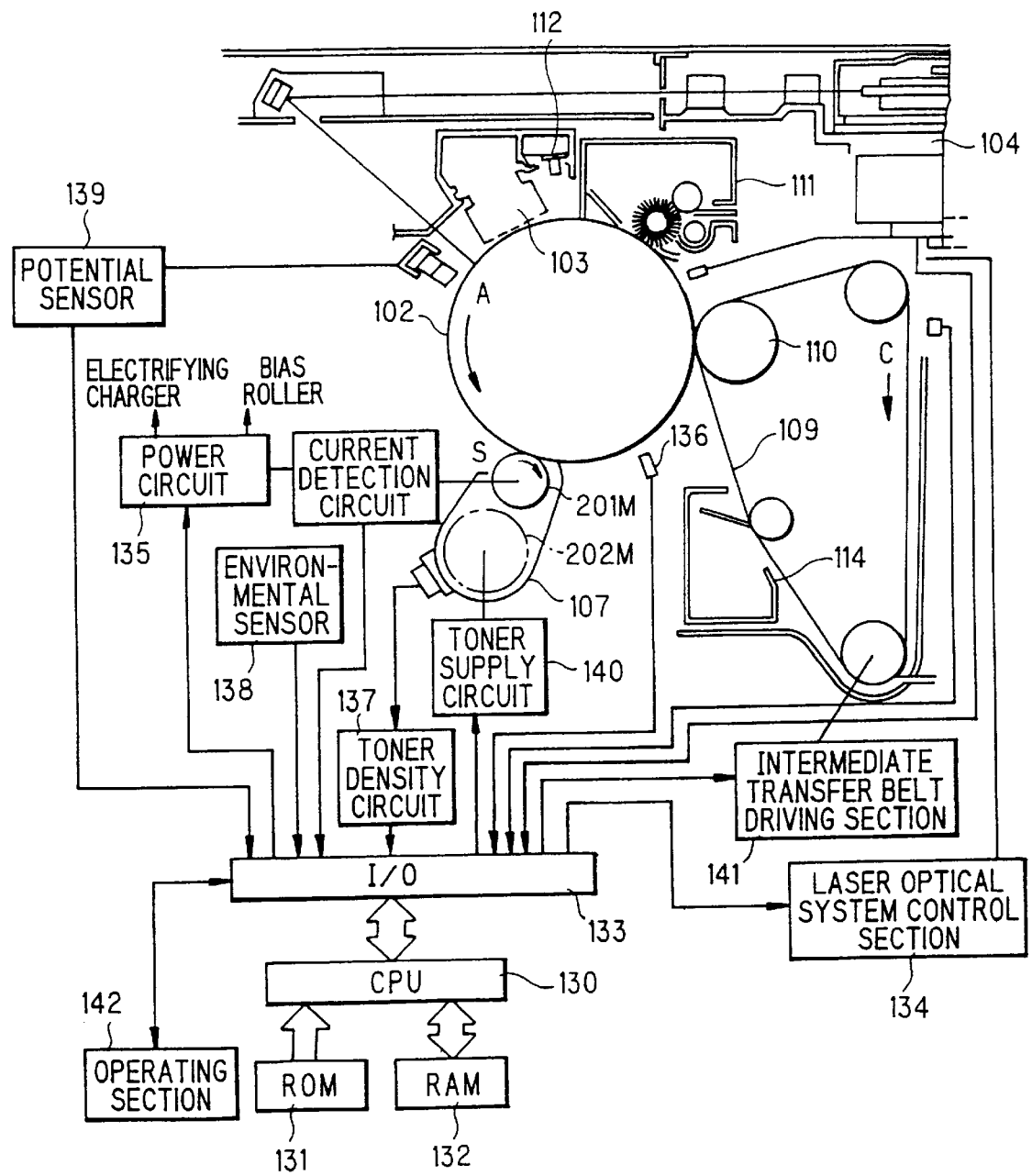
FIG. 3 is a view for explanation of a control system of the main body of the copying machine shown in FIG. 2.

Next description is made for a control system of the copying machine with reference to FIG. 3. FIG. 3 is a view for explanation of the control system in the main body of the copying machine shown in FIG. 2.

As shown in FIG. 3, the control system has a main control section (CPU) 130, and a ROM 131 and a RAM 132 to this main control section 130 are additionally provided therein. Connected to the main control section 130 are also a laser-optical system control section 134, a power supply circuit 135, an optical sensor 136, a toner density sensor 137, an environment sensor 138, a photosensitive body surface potential sensor 139, a toner supplying circuit 140, an intermediate transfer belt driving section 141, and an operating section 142 respectively through an interface I/O 133. The laser system control section 134 adjusts laser output from the laser optical system 104, and the power supply circuit 135 gives a specified discharging voltage for electrification to the electrifying charger 103, gives a development bias at a specified voltage to the developing devices 105, 106, 107, 108, and also gives a specified transfer voltage to the bias roller 110 as well as to the transfer bias roller 113.

The optical sensor 136 comprises light-emitter such as light-emitting diodes or the like and light-receptors such as photosensors or the like each provided adjacent to an area of the image after being transferred from the photosensitive drum 102, and a quantity of deposited toner in a toner image for a detection-pattern latent image formed on the photosensitive drum 102 and a quantity of deposited toner in the background color section are detected for each color respectively, and so-called potential residues on the photosensitive body after electrification thereon is removed is also detected.

The detection output signal from this photoelectric sensor 136 is applied to the photoelectric sensor control section not shown herein. The photoelectric sensor control section computes a ratio between the quantity of deposited toner in the detection-pattern toner image and the quantity of deposited toner in the background color section, compares the ratio value to the reference value to detect fluctuation in an image density, and corrects the control values for the toner density sensor 137.

Further, the toner density sensor 137 detects a toner density according to changes of magnetic permeability in a developer existing in each of the developing devices 105 to 108. The toner density sensor 137 has a function of applying a toner supply signal with amplitude, in a case where the detected toner density value is compared to the reference value and the toner density is found under the specified value which indicates a short of toner therein, corresponding to the shortage thereof to the toner supplying circuit 140. The potential sensor 139 detects a surface potential of the photosensitive body 102 as an image carrier, and the intermediate transfer belt driving section 141 controls driving of the intermediate transfer belt 109.

A developer containing M-toner and carrier is accommodated, for instance, in the magenta-developing device 107 and is agitated in association with rotation of a developer agitating member 202M, so that the developer sucked up onto a sleeve 201M by a developer restricting member is adjusted on the developing sleeve 201M. This supplied developer rotates in the direction of rotation of the developing sleeve 201M as a magnetic brush while it is magnetically carried on the developing sleeve 201M. Similarly, developing sleeves 201C, 201Y, and 201B are provided for C-toner, Y-toner, and B-toner, agitated by agitating member 202C, 202Y, and 202B, respectively, as shown in FIG. 2.

Figure 1:
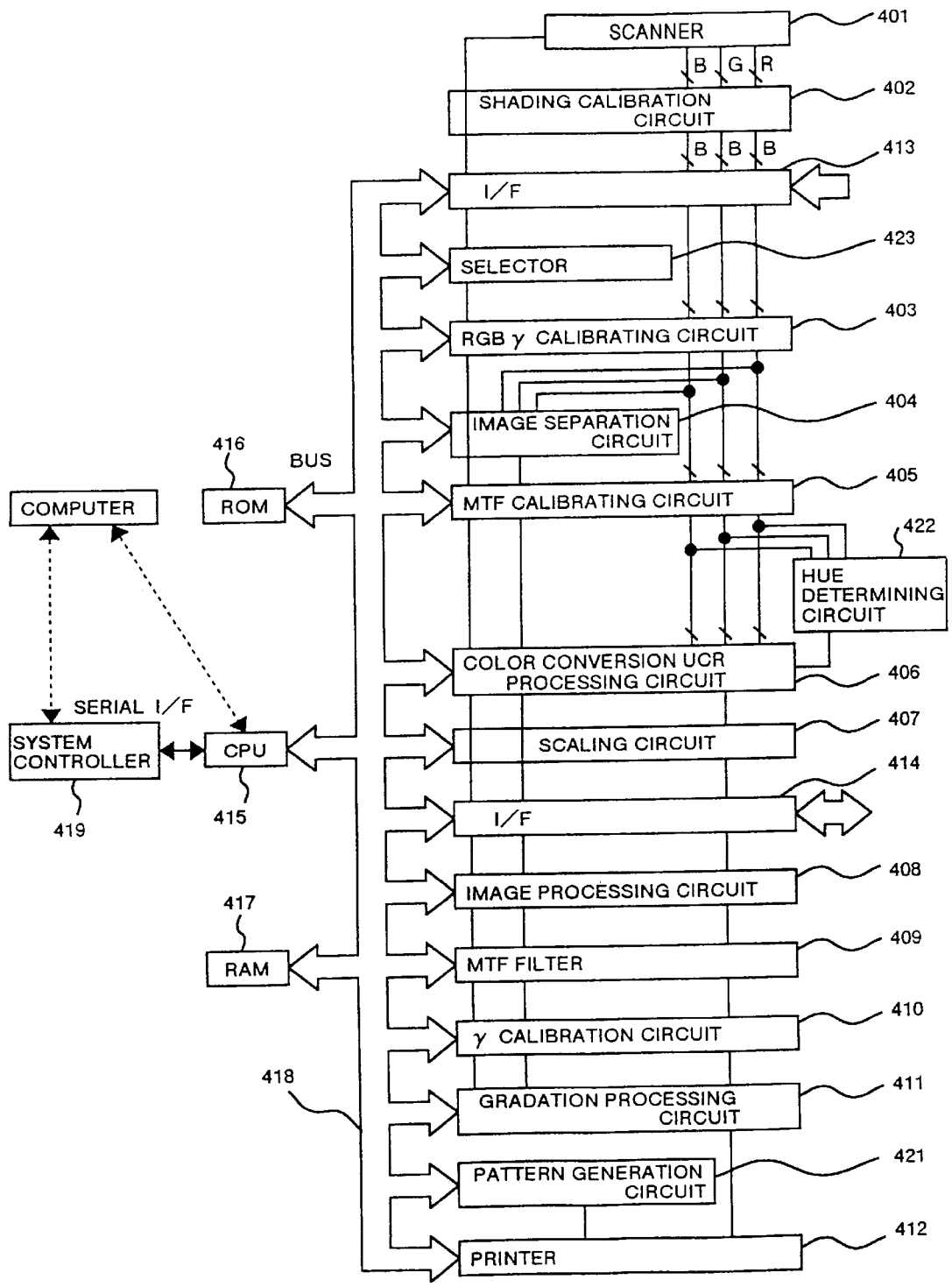
FIG. 1 is a block diagram showing electric configuration of an image processing section according to Embodiment 1 of the present invention.

Next description is made for electric configuration of an image processing section with the reference to a block diagram shown in FIG. 1.

In FIG. 1, designated at the reference numeral 401 is a color scanner, at 402 a shading calibrating circuit, at 403 an RGB γ-calibrating circuit, at 404 an image separating circuit, at 405 an MTF calibrating circuit, at 406 a color conversion-UCR processing circuit, at 407 a scaling circuit, at 408 an image processing (creating) circuit, at 409 an MTF filter, at 410 a γ-calibrating circuit, at 411 a gradation processing circuit, and at 412 a printer.

A document to be copied is resolved into colors of R, G, B to be read by G, B to be read by the color scanner 401. Non-uniformity due to characteristics of an image pickup device or non-uniformity in irradiation of a light source or the like are calibrated in the shading calibrating circuit 402. Read signals from the color scanner 401 are converted from data for reflection factors to data for brightness in the RGB γ-calibrating circuit 403. Determination is made between a character section and a photographic section as well as between chromatic color and achromatic color in the image separating circuit 404. Degradation of an MTF characteristics in an input system, especially in a high frequency area is calibrated in the MTF calibrating circuit 405. The color conversion-UCR processing circuit 406 comprises a color calibration processing section for correcting a difference between color-resolution characteristics in the input system and spectral characteristics of color materials in an output system and computing a rate of color materials for YMC required for faithful color reproduction and a UCR processing for replacing a section in which three colors of YMC are superimposed on each other with Bk (black). The color calibration processing in the color calibration processing section can be realized by performing matrix-operation as described below.

Expression 1

$$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} B'' \\ G'' \\ R'' \end{bmatrix} \quad (1)$$

Herein, R", G", B" indicate complements of R, G, B respectively. Matrix factors a j i are decided depending on spectral characteristics of the input system and output system (color materials). Herein, an one-dimensional masking equation is used as an example, but by using a second term such as B"2, B" G", or further higher-term, color calibration can more precisely be executed. An operation expression may be changed according to a hue, or a Noigebauwer expression may be used. In any of the methods, Y, M, C can be obtained from values of B", G", R" (or may he B, G, R).

On the other, the UCR processing can be executed by computing using the below equations for each color.

$$Y'=Y-\alpha \cdot \min(Y, M, C) \quad (2)$$
$$M'=M-\alpha \cdot \min(Y, M, C) \quad (3)$$
$$C'=C-\alpha \cdot \min(Y, M, C) \quad (4)$$
$$Bk=\alpha \cdot \min(Y, M, C) \quad (5)$$

In these equations from (2) to (5), α indicates a factor for deciding a rate for UCR, and when α is equal to 1 (α=1), 100% of UCR processing is executed. This α may be a specified value, or in a high-density section, for instance, α is close to 1 and in the highlight section, an image in the highlight section can be smoothed by making α closer to 0.

A hue determining circuit 422 is connected to between the MTF calibrating circuit 405 and the color conversion-UCR processing circuit 406. Determination is made in this hue determining circuit 422 as to which hue signal among RGBCMY an RGB image signal indicates, and a color conversion coefficient is selected according to each hue.

In the scaling circuit 407, vertical and horizontal scaling is executed, and a repeat processing or the like is executed in the image processing (creating) circuit 408. Executed in the MTF filter 409 is processing for changing frequency characteristics of image signals such as edge enhancement or smoothing or the like according to a user's taste to an image such as a sharp image or a soft image or the like. Image signals are calibrated in the γ-calibrating circuit 410 according to characteristics of a printer 412. Processing such as eliminating a background color or the like can concurrently be executed also in the γ-calibrating circuit 410. Dither processing or pattern processing is executed in the gradation processing circuit 411.

Provided therein are interfaces I/F 413, 414 for processing image data read by the scanner 401 in an external image processing unit or the like or outputting the image data from the external image processing unit to the printer 412.

A CPU 415 for controlling the image processing circuit described above, a ROM 416, and a RAM 417 are connected to each other through a BUS 418. The CPU 415 is connected to a system controller 419 through a serial I/F, and commands from the operating section or the like not shown herein are sent thereto. It should be noted that, in FIG. 1, the reference numeral 421 indicates a pattern generating circuit, the reference numeral 422 indicates a hue determining circuit, and the reference numeral 423 indicates a selector although particular description is not made therefor herein.

Figure 4:
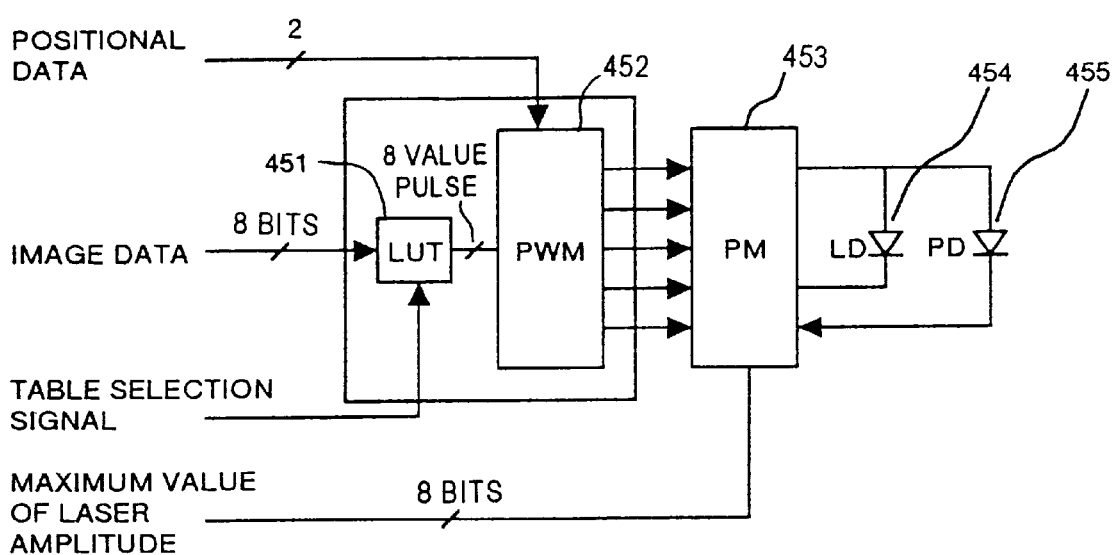
FIG. 4 is a block diagram showing a laser modulator according to Embodiment 1.

Next description is made for a laser modulator with reference to the block diagram shown in FIG. 4. It is assumed herein that a write frequency is 18.6 MHz, and a scanning time for 1 pixel is 53.8 nsec. 8 bits of image data can be γ-converted with a look up table (LUT) 451. The 8 bits of image data are converted to a 8-value pulse width according to signals with the 3 bits at the highest end of the 8 bits of image signal by a pulse width modulator (PWM) 452, are subjected to 32-value power modulation according to signals with the 5 bits at the lowest end by a power modulator (PM) 453, and laser diodes (LD) 454 emit light according to the modulated signals. Light-emitting amplitude is monitored by a photodetector (PD) 455 to be calibrated each one dot.

It should be noted that the maximum value by a laser beam amplitude can be changed to 8 bits (256 levels) discretely from image signals. A beam diameter (this beam diameter is specified as a width when the beam amplitude is attenuated to 1/e2 while the beam amplitude at rest is the maximum value) in the main scanning direction to a size of one pixel is not more than 90%, and desirably 80%. In conditions of 400 DPI and 63.5 μm per one pixel, a desirable beam diameter is not more than 50 μm.

Figure 5:
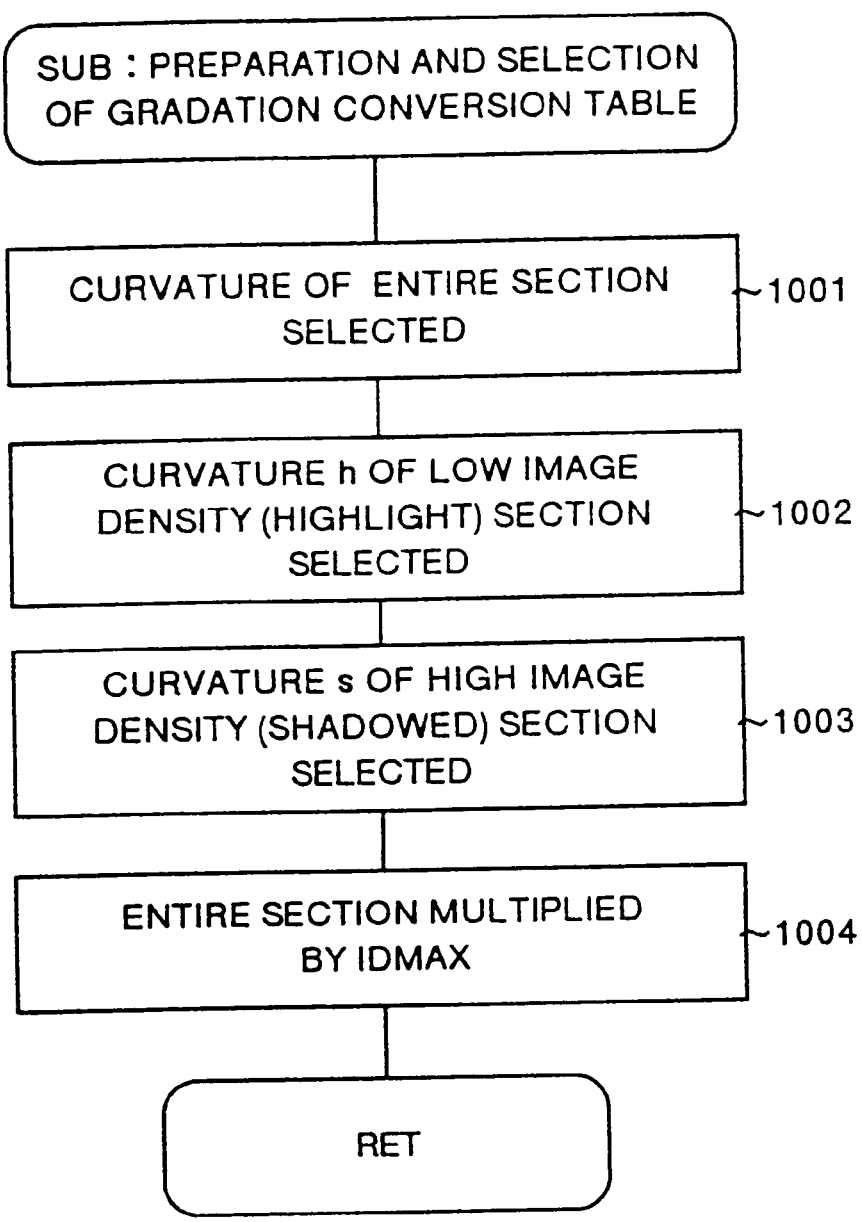
FIG. 5 is a flow chart for explanation of a sequence of preparing a gradation conversion table.

Description is made for a sequence of preparing a gradation conversion table (LUT) in the γ-calibrating circuit 410 with reference to the flow chart shown in FIG. 5. In this sequence, at first, curvature for the entire section is selected (step 1001), and then curvature for the low image density (highlight) section and that for the high image density (shadow) section are selected (steps 1002, 1003). Then, the curvature for the entire section is multiplied by a factor IDMAX so that the image density has a desired value to prepare a gradation conversion curve (step 1004).

Figure 6:
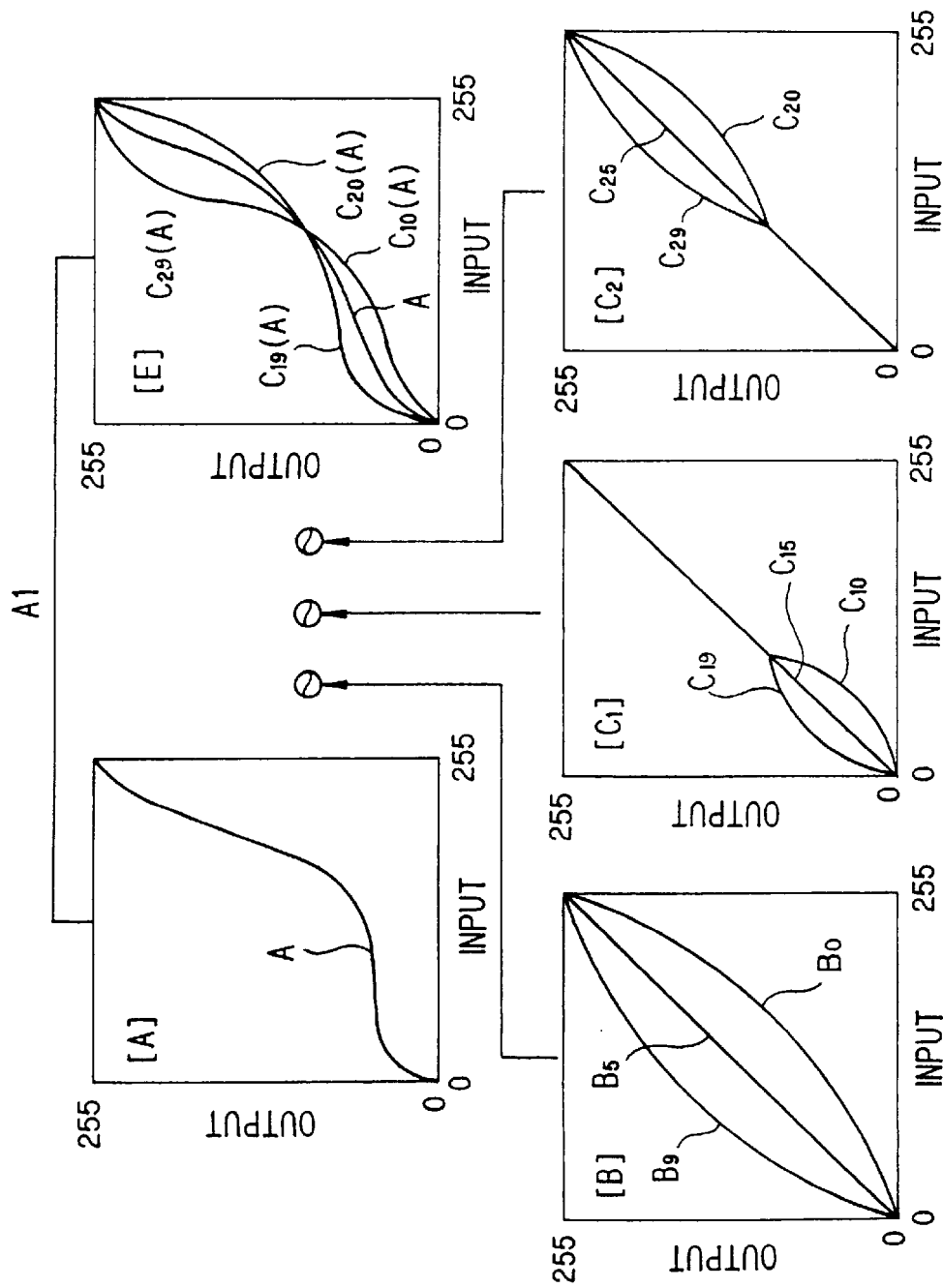
FIG. 6 is a view for explanation of selecting curvature for the entire section.

Detailed description is made for the processing in the step 1001 with reference to FIG. 6. FIG. 6 is a view for explanation of an operation for selecting curvature for the entire section. It is assumed herein that a gradation curve as a reference is A, gradation conversion for changing curvature for the entire section is B, gradation conversion for changing curvature for the highlight area (low density area) is CH, and gradation conversion for changing curvature for the shadow area (high density area) is CS. Then, assuming that the gradation curve obtained as a result of gradation conversion of the gradation curve A according to the gradation conversion B is E, and this result is described by the following expression of E=B and as (A).

Outline of the above expression can more specifically be described as follows using the format of a programming language C:

Expression 2

```
                        <List 1> typedef int Table[256];
Table       A, E;
int    B( int A, in curvature)
{
        int   value;
        /*   Computing for changing curvature   */
        according to a degree of curvature
        ...
        return  value;
}
        Processing for changing
/* full() : curvature for the entire section */
Table   full(int curvature)
{
        /* curvature is a degree of curve   */
        int  i;
        for(i = 0; i < = 255; i+ +)
                E[i] = B( A[i],   curvature);
        return  E;
}
```

Herein, B indicates a function for changing the curvature of A.

As an example of this function, in a case of 8-bit image signals, it is possible to use a quadratic Pege function satisfying the following conditions of 0=B (0, n), 255=B (255, n) (n: an arbitrary integer).

Figure 7:
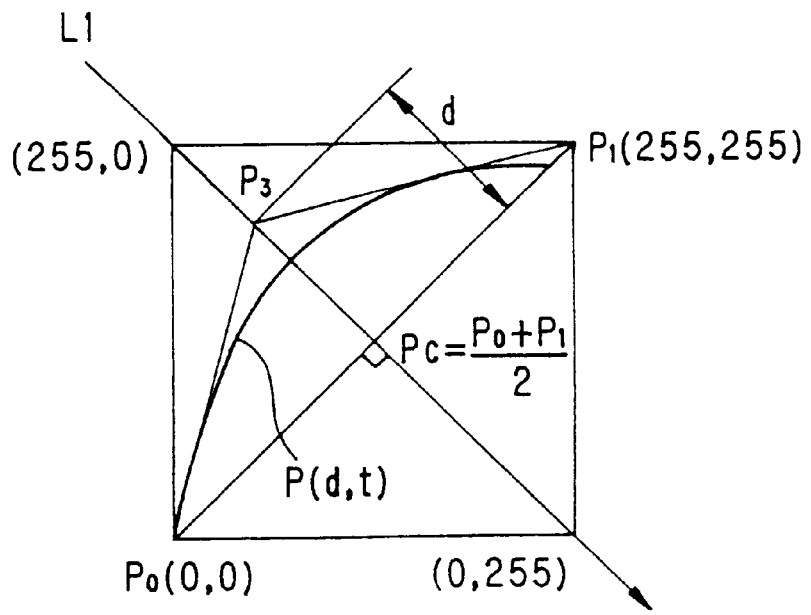
FIG. 7 is a view for explanation of the selected curvature.

The Pege function satisfying the above conditions is described as a quadratic Pege curve from a straight line P0P1 connecting a starting point P0 (0, 0) to an endpoint P1 (255, 255) as shown in FIG. 7, a straight line L intersecting this straight line P0P1, and a control point P3 existing on this straight line L and setting a distance d from a point of the intersection of the straight line P0P1 and the straight line L to a parameter.

In the function described above, by proportioning a distance d thereto according to an integer curvature which is an argument of the function B, the curvature can be changed. Description is made for a case of a function for the straight line L1 intersecting at right angles the straight line P0P1 and for a case of a function for straight lines L2 parallel to the vertical axis of the figure as examples.

As for a control point in the first example, when a distance d to this point is set to a parameter to a central point Pc, of a line segment P0P1 made of both edge points P0, P1, which is Pc=(P0+P1)/2=(127.5, 127.5), (127, 127), or (128, 128), the control point P3 is obtained by the following expression:

$$P3(d) = Pc + \left(-d/\sqrt{2}, d/\sqrt{2}\right) \tag{6}$$
$$= \left(127.5 - d/\sqrt{2}, 127.5 + d/\sqrt{2}\right)$$

With this expression, a gradation conversion curve P (d, t) can be obtained by the following expression:

$$P(d, t) = P0 \cdot t^3 + 2P2(d)t(1-t) + P1(1-t)^3 \tag{7}$$

However, t is a parameter in a range of $0 \leq t \leq 1$. P (d, t) is given as a set (x, y) of input (x) and output (y) to the gradation conversion curve, so that, assuming that x=A from the integer A given as an argument to the function B ( ), t is obtained from the expression (7), and the obtained t is substituted into the expression (7) again to obtain an output value y.

Actually, in place of computing as described above each time, all the sets ($0 \leq x \leq 255$) are previously obtained, and by storing the values as a table in the ROM 416, a time required for computing can be reduced. Several sets (or some tens of sets) of this gradation calibration table are stored in the ROM 416 by changing the curvature thereof. A curvature is given by an argument curvature to the function B ( ).

With this feature, <List 1> is rewritten as follows:

Expression 3

```
        const     table_max = 9:
        typedef int  Table[256];
        Table     A, E, B[table_max = 9;
            Processing for changing
        /*(): curvature of the entire sectian
        Table    full(int curvature)
        {
            curvature specifies a degree
            /* of curve.        */
            int   i;
            for (i = 0; i < = 255; i+ +)
                E[i] = B[curvature][ A[i] ]:
            return     E;
        }
        main()
        {
            /* curvature is a degree of curve    */
            int       curvature = 1;
            E = full( curvature);
        }
```

It should be noted that, in the example described above, Table_max=9 is assumed, so that the table includes 9 lines each having a different curvature respectively. Also, in the example as described above, the Pege curve is used, however, in addition, a higher function or an index/a logarithmic function or the like can be used as required.

Also in the processing in step 1002 and 1003, curvature for the low image density (highlight) area and a high image density (shadow) area can be changed by executing processing like that in step 1000. So the <List 1> can be rewritten to a more general form, as follows.

Expression 4

---
<List 3>
---

```
const      table_max = 9;
typedef int Table[256];
Table      A, E, B[table_max];
           Processing for changing
/* Transform(): curvature              */
Table   Transform(Table Transformer, Table Original)
{
/*      This function executes curvature of the      *
*       gradatian conversion curve called Original   *
        using the gradation conversion curve
*                                      called Transformer */
        int  i;
        for(i = 0;i < = 255;i+ +)
                E[i] = Transformer[ Original[i] ];
        returu E;
}
main()
{
        /* curvature is a degree of curve     */
        int  curvature = 1;
        E = Transform( B[curvature], A);
        Curvature of gradation conversion curve A is
/*      changed using the gradation conversion curve B*
*       [curvature]    */
}
```
---

When conversion of a highlight conversion curve CH (h) as well as of a shadow conversion curve CS (s) is executed, the expression can be described as follows:

Expression 5

---
<List 4>
---

```
const      table_max =9;
typedef int  Table[2569 ;
Table      A, B[table_max], E, CH[table_max], CS[table_max];
           Processing for
/* Transform(): changing curvature     */
Table   Transform( Table Transformer, Table Original);
main()
{
        int    curvature, h, s;
/*      Curvature of a curve is changed by changing numerical values
        of curvature, h, s   */
        /* Curvature of the entire section is changed */
        E = Tranform( B[curvature, A):
           Curvature of the low image density
        /*(highlight) section is changed      */
        E = Tranform( CH[h], E):
           Curvature of high image density
        /* (shadowed) section is changed      */
        E = Tranform( CS[s], E):
}
```
---

In this expression, curvature, h, s indicate values for deciding curvatures for the entire section, highlight section, and shadow section. It should be noted that curvatures for the highlight section and for the shadow section are prepared independently from each other.

A gradation conversion curve for changing curvature for a particular density area like in a highlight area and a shadow area is generated as described below.

Namely, a gradation conversion curve is generated using a tertiary Pege curve from a straight line P0P1 between a starting point P0 and an endpoint P1, a straight line L intersecting at right angles this straight line P0P1, and a control point P2 existing on this straight line L and setting a distance d from a point of the intersection of the straight line P0P1 and the straight line L to a parameter.

Also in this case, description is made for a case where conversion is made by using a function for the straight line L1 intersecting at right angles the straight line P0P1 and for a case where conversion is made by using a function for a straight lines L2 (not shown herein) parallel to the vertical axis in the figure like in the case where conversion is made by using the quadratic Pege curve.

Figure 8:
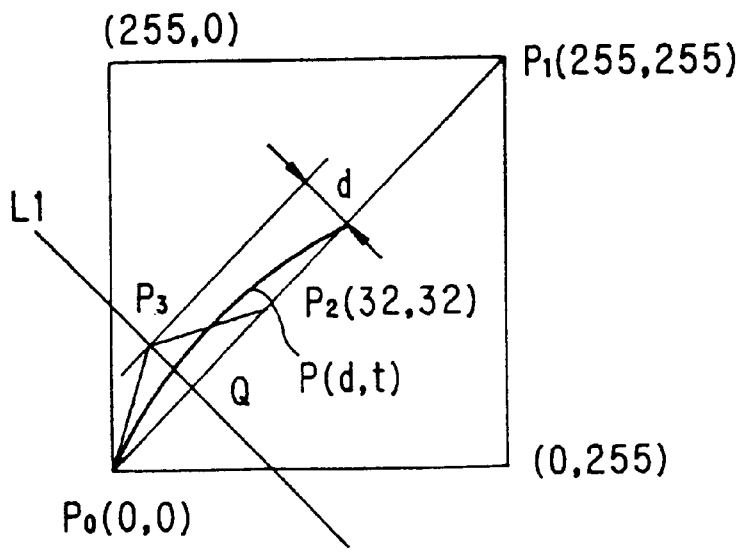
FIG. 8 is a view showing an example of a conversion curve for changing gradation characteristics in a highlight area.

A conversion curve for changing gradation characteristics for a highlight area is generated, for instance, as follows, as shown in FIG. 8. It is assumed that a starting point P0 and an endpoint P1 are set as follows: P0=(0, 0) and P1=(255, 255), respectively, and that a first control point P2 is set to P2=(32, 32). The control point P3 in the example shown in FIG. 7 is obtained as follows by setting a distance d from the point of intersection of the straight line P0P1 and the straight line L1 as a parameter:

$$P3(d)=(16, 16)+(-d/\sqrt{2}, d/\sqrt{2})$$

Also, the control point P3 in the second example is obtained as follows by setting a distance d from the point of intersection of the straight line P0P1 and the straight line L1 as a parameter:

$$P3(d)=(16, 16)+(0, d)$$

By using these values from P0 to P3, a gradation conversion curve P (d, t) is obtained through the following expression:

Expression 6

$$P(d, t)=P0 \cdot t^3+3 \cdot P2 \cdot t^2 \cdot (1-t)+3 \cdot P3(d) \cdot t \cdot (1-t)^2+P1 \cdot (1-t)^3 \quad (8)$$

Herein, P1=(255, 255) is set as an endpoint, but it is assumed that an endpoint P1 is set to a point on a line segment m: (0, 0)–(255, 255) such as P1=(64, 64) or the like. In this case, a line segment not included in the line segment P0P1 on the line segment m is used as equivalence conversion for gradation conversion as it is, and areas other than the line segment function as a gradation conversion curve for changing curvature for particular density area like the highlight area as well as the shadow area.

Next description is made for operations of auto color calibration (ACC) for an image density (gradation) with reference to FIG. 9 to FIG. 15.

Figure 9:
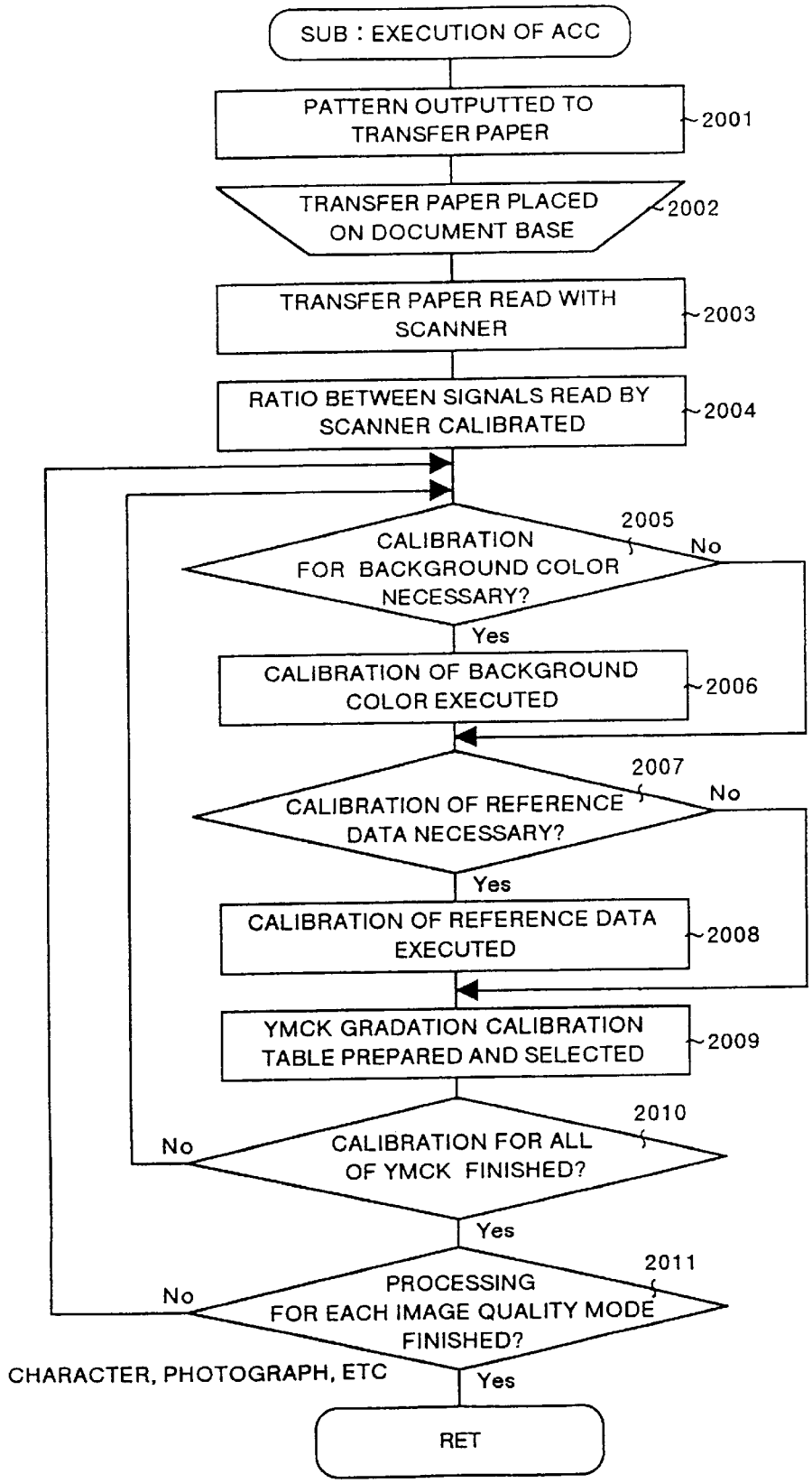
FIG. 9 is a flow chart showing operations for auto color calibration in an image density.
Figure 10:
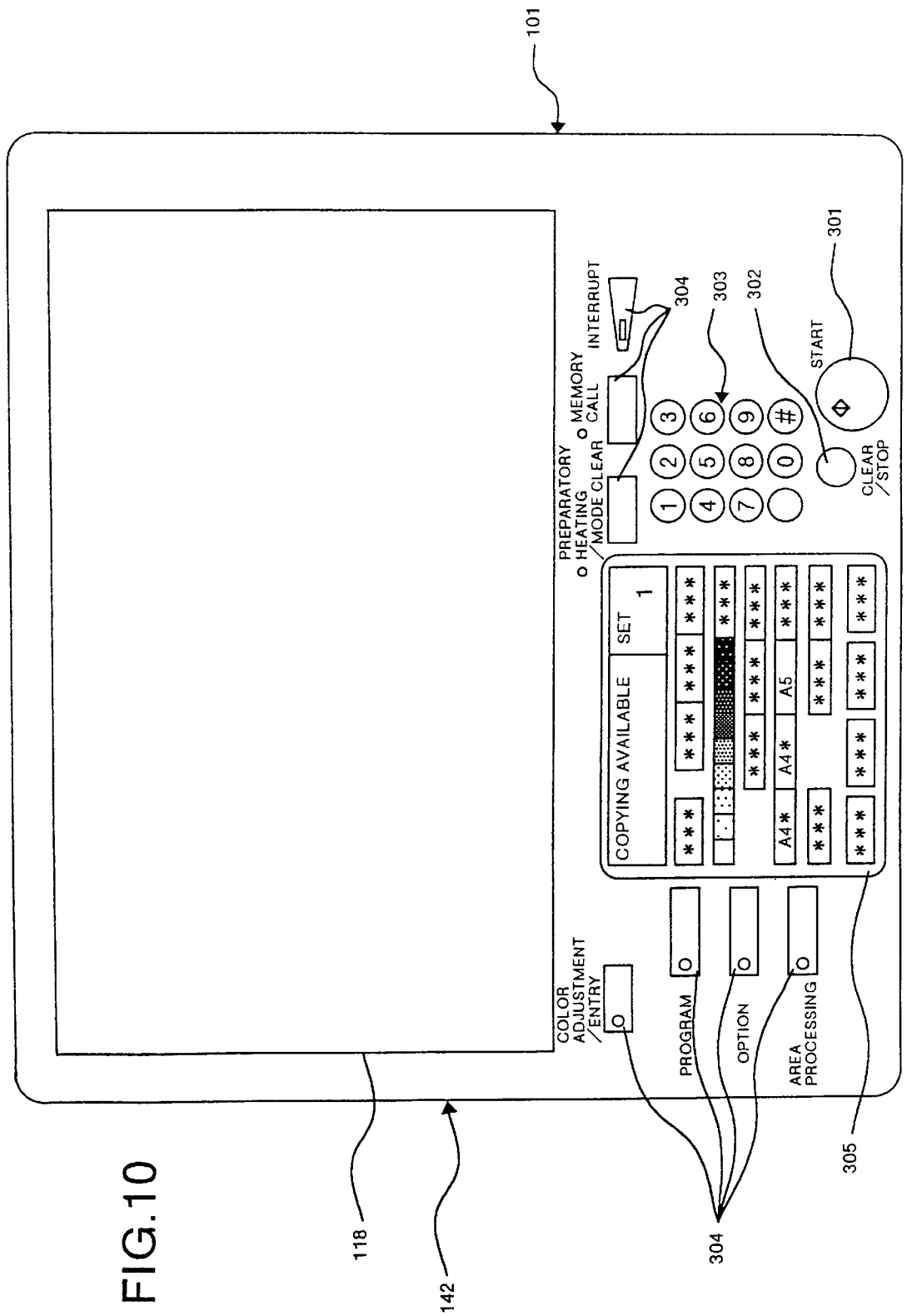
FIG. 10 is a plan view showing an operating section.
Figure 11:
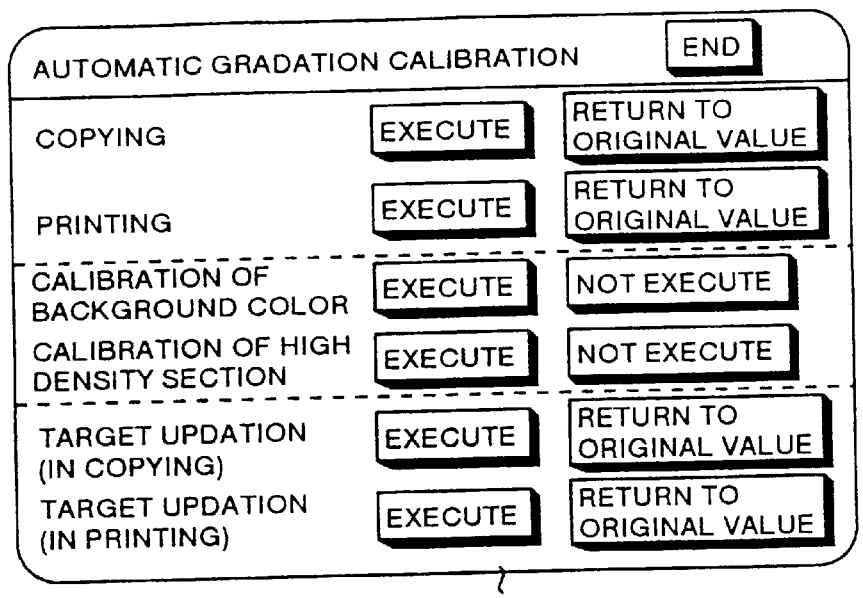
FIG. 11 is a plan view showing a liquid-crystal display screen of the operating section at the time of invoking an ACC menu.
Figure 12:
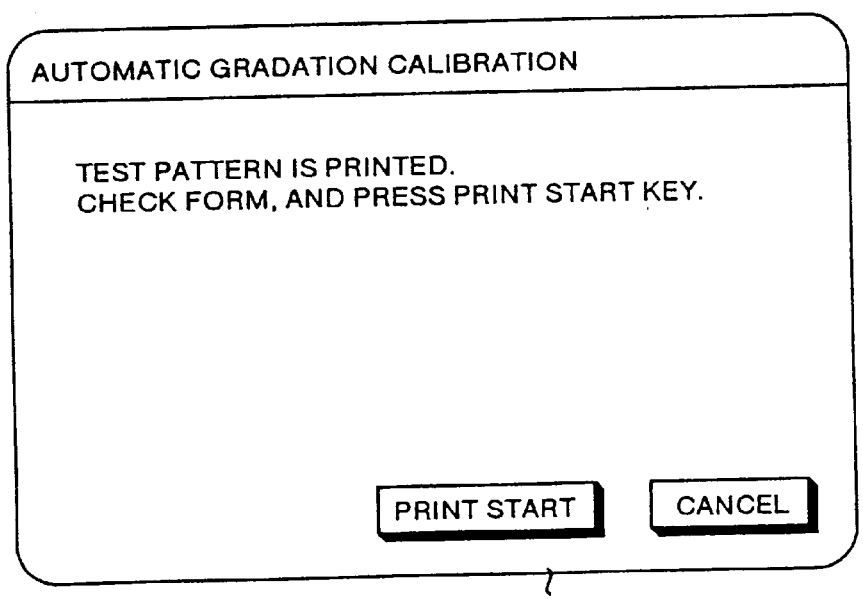
FIG. 12 is a plan view showing a liquid-crystal display screen of the operating section when the performance of the auto color calibration required for using a printer is selected.
Figure 13:
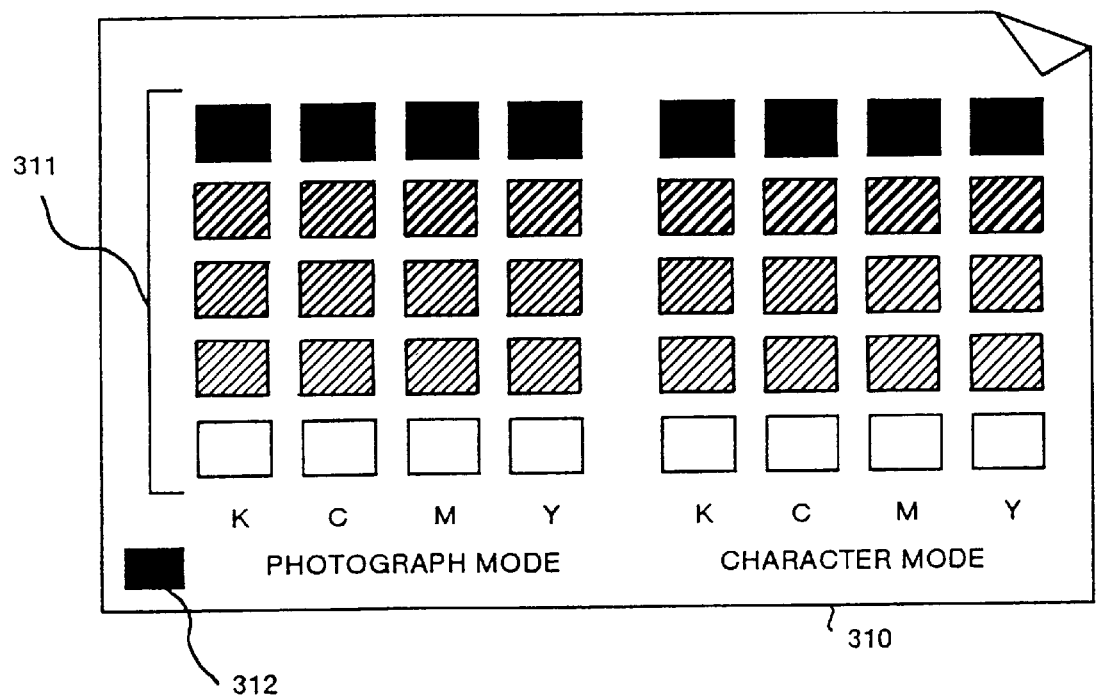
FIG. 13 is a plan view showing density gradation patterns on transfer paper when a print-start key is selected.
Figure 14:
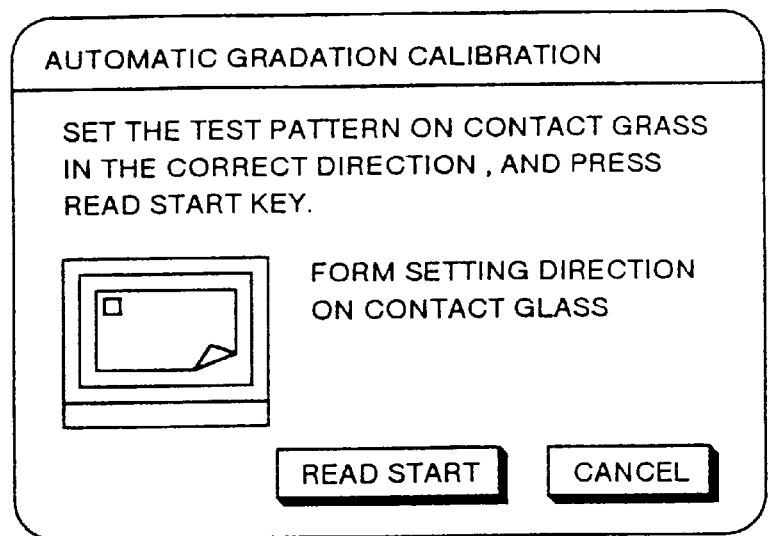
FIG. 14 is a plan view showing a liquid-crystal display screen of the operating section after the patterns are outputted onto the transfer paper.
Figure 15:
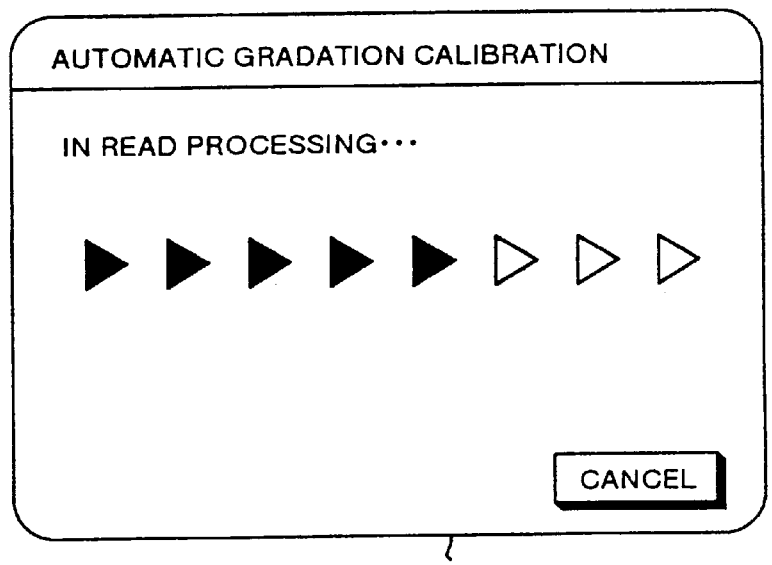
FIG. 15 is a plan view showing a liquid-crystal display screen of the operating section during processing of auto color calibration.

FIG. 9 is a flow chart showing operations for auto color calibration in an image density, FIG. 10 is a plan view showing an operating section, FIG. 11 is a plan view showing a liquid-crystal display screen of the operating section at the time of invoking an ACC menu, FIG. 12 is a plan view showing a liquid-crystal display screen of the operating section when the performance of the auto color calibration required for using a printer is selected, FIG. 13 is a plan view showing density gradation patterns on transfer paper when a print-start key is selected, FIG. 14 is a plan view showing a liquid-crystal display screen of the operating section after the patterns are outputted onto the transfer paper, and FIG. 15 is a plan view showing a liquid-crystal display screen of the operating section during processing for auto color calibration.

Provided in the upper side of the main body of a copying machine are a plurality of operating buttons 304, as shown in FIG. 10, for executing various type of operations such as preparatory heating/mode clear, memory call, interrupt operation, color adjustment/registration, program, option, and area processing or the like together with a start button 301, a clear/stop button 302, a ten key 303 for setting the number of sheets to be copied or the like each in the front side of the contact glass 118. A display screen 305 of a liquid-crystal display unit (described also as a liquid-crystal screen hereinafter) is also provided thereon so that it is surrounded by these buttons. The display screen 305 has a tablet function for outputting a signal by pressing a display point or contacting a display point.

When an ACC menu is called on the liquid-crystal screen 305 of the operating section 142 as shown in FIG. 10, the liquid-crystal screen 305 is switched from the display thereon to the display as shown in FIG. 11. When [Execute] of the auto color calibration for "copying is used" or "printing is used" is selected, the display on the liquid-crystal screen 305 is changed to the display as shown in FIG. 12. In a case where "copying is used" is selected, the gradation calibration table used when a copier is used is changed, and in a case where "printing is used" is selected, the gradation calibration table used when a printer is used is changed each according to reference data.

Herein, when "print start" is selected on the display screen 305 shown in FIG. 12, as shown in FIG. 13, a plurality of density gradation patterns 311 corresponding to each of image quality modes for colors of YMCK, characters and photographs are formed on transfer paper 310 (step 2001 in FIG. 9). It should be noted that the reference numeral 312 indicates a position specifying mark. The density gradation patterns are previously stored and set in the ROM of the computer 420 shown in FIG. 1. A written value for a pattern has 16 patterns such as 00h, 11h, 22h, . . . EEh, FFh displayed in hexadecimal digit. In FIG. 13, a patch for gradation except a background color section is displayed, and an arbitrary value, of 8 bits of signal in 00h to FFh, can be selected. In the character mode, dither processing such as pattern processing is not executed, but a pattern is formed in 256 levels per one dot, while in a photograph mode, a written value for a laser is formed by distributing a sum of write values by two pixels each adjacent to each other in the main scanning direction.

Namely, processing of patterns in a case where a written value for a first pixel is n1 and a written value for a second pixel is n2 are distributed as follows:

In a case of n1+n2≦255,
  a written value for the first pixel: n1+n2
  a written value for the second pixel: 0
In a case of n1+n2>255,
  a written value for the first pixel: 255
  a written value for the second pixel: n1+n2−255 or,
In a case of n1+n2≦128,
  a written value for the first pixel: n1+n2
  a written value for the second pixel: 0
In a case of 128<n1+n2≦256,
  a written value for the first pixel: 128
  a written value for the second pixel: n1+n2−128
In a case of 256<n1+n2≦383,
  a written value for the first pixel: n1+n2−128
  a written value for the second pixel: 128
In a case of 383<n1+n2,
  a written value for the first pixel: 255
  a written value for the second pixel: n1+n2−255

Pattern processing used for actual image forming is used other than the above processing.

After a pattern 311 is outputted onto transfer paper 310, a display on the display screen 305 is changed to a display as shown in FIG. 14 so that the transfer paper 310 is mounted on the contact glass 118.

The transfer paper 310 with the pattern 311 formed thereon is placed on the contact glass 118 (step 2002 in FIG. 9), and "read start" is selected on the display screen 305 as shown in FIG. 14, then the scanner 401 runs, and RGB data for a YMCK density pattern 311 is read (step 2003 in FIG. 9). In this processing, data for the pattern section and data for a background color section of the transfer paper 310 are read.

The read value for the pattern 311 is calibrated using a RGB calibration value described in detail later (step 2004 in FIG. 9). In a case where processing is executed using data for a background color (step 2005 in FIG. 9), processing for background color data to read data is executed (step 2006 in FIG. 9), and in a case where the reference data is calibrated (step 2007 in FIG. 9), a YMCK gradation calibration table is prepared and selected (step 2009 in FIG. 9) after processing (step 2008 in FIG. 9) for a high-image density section to the reference data is executed.

The processing is executed in each of the image quality modes such as for each color of YMCK (step 2010 in FIG. 9), and for photographs and characters (step 2011 in FIG. 9). During the processing, the display on the display screen 305 is changed to that as shown in FIG. 15. A key for [return to the original value] is shown on the display screen 305 as shown in FIG. 11 so that, in a case where the operator gets an undesirable result of image forming with the YMCK gradation calibration table after the processing thereof is finished, the operator can select the YMCK gradation calibration table before processing thereof is executed.

Next description is made for calibration of a background color.

There are two objects for calibration processing of a background color. One of them is to correct a whiteness degree of transfer paper used for ACC, and the other one is to correct color or the like of something on a rear surface of the transfer paper or seen through the paper. Namely, the former is executed to eliminate the difference between whiteness degrees of used transfer paper because, even if images are formed at the same time in the same types of apparatus, values read by the scanner 401 are different from each other. As a demerit generated when a whiteness degree is not calibrated, there is a case where a desired color reproduction can not be obtained because, if regenerated paper having a low whiteness degree is used for the ACC, and when a yellow gradation calibration table is prepared, calibration is executed so that a yellow element therein is reduced because regenerated paper generally contains a lot of yellow element, and in a case where an image is copied onto art paper having a high whiteness degree with the calibration in the above state, an obtained image results in containing not much yellow element therein.

The former is executed to eliminate a case where color of a pressure plate for pressing down transfer paper or the like is seen through the paper to be disadvantageously read by the scanner 401 and copied when the transfer paper used for the ACC is not thick enough in its thickness (paper thickness). For instance, in a case where an auto document feeder called as ADF is mounted in place of a pressure plate, a belt is used for carrying a document, paper has a low whiteness degree and sometimes has slightly grayish white because of a rubber based material used for this belt. In a case where the paper having the color described above is used, an image signal to be read is read as a signal for an image over which the density is apparently higher than original one, so that, when a YMCK gradation calibration table for the image is prepared, the density therefor is intentionally made lower by the degree to be the original one. In a case where thick paper having low permeability is used this time in the above state, the image is reproduced as one in a low density on the whole, so that a desirable image can not always be obtained.

To prevent the inconvenience as described above, a image signal read from the pattern section is calibrated according to an image signal from the background color section of the paper.

However, there are some merits even in a case where the calibration as described above is not executed. Namely, in a case where transfer paper always containing a lot of yellow element as regenerated paper, the paper to which any calibration is not executed has better color reproduction to color with a yellow element. In a case where only thin transfer paper is used, there is the merit that a gradation calibration table matched to thin paper can be prepared.

As described above, and as shown in FIG. 11, keys for calibrating or not calibrating a background color are displayed on the display screen 305 so that the calibration of the background color can be ON or OFF according to the user's conditions and taste.

It is assumed that a written value for a gradation pattern formed on a photosensitive body is set to LD (i) (wherein i=0, 1, . . . 9), and a vector of read values for the formed pattern by the scanner 401 is set to v[t][i](r[t][i], g[t][i], b[t][i]) (t=Y, M, C, or K, i=0, 1, . . . 9). It should be noted that, in place of (r, g, b), a gradation pattern may be described by brightness, chroma, hue angle (L*, c*, h*), or brightness, redness, blueness (L*, a*, b*) or the like. It is also assumed that read values for white color as reference values previously stored in the ROM 416 or RAM 417 are set to values (r[W], g[W], b[W]).

When it is assumed that a pattern number of a density in an image is set to the k-th pattern (for instance, a pattern or the like of which image density is highest is selected) read values for a pattern (Δr[t][k], Δg[t][k], Δb[t][k]) is obtained as follows from read values (r[t][i], g[t][i], b[t][i]) for RGB signals to each of YMCK toner:
Expression 7

$$\Delta r[t][k] = r[W] - r[t][k],$$

$$\Delta g[t][k] = g[W] - g[t][k],$$

$$\Delta b[t][k] = b[W] - b[t][k] \quad (9)$$

On the other hand, in the RAM 417, percentages of RGB elements in the read value for a pattern is stored for each of the YMCK toners as follows:
Expression 8

$$k[s][t]\{s=R, G, \text{ or } B; t=Y, M, C, \text{ or } K|k[s][t]1\} \quad (10)$$

{k[s][t]1} in expression (10) indicates that a decimal close to a numeral 1 is taken, but inside a copying machine, it is held as integer data as described below:
Expression 9

$$k[s][t] = k1[s][t]/2^n (k1[s][t] \text{ is an integer of } 2^n)$$

The data is, for instance, n=10, $2^n$=1024 or the like. The values for K[s][t] which are calibration values for RGB signals obtained as described above are shown in Table 1.

TABLE 1

Calibration values for RGB signals:k [s] [t]

| t | s | | |
|---|---|---|---|
| | R | G | B |
| K | 1.00 | 1.00 | 1.00 |
| C | 1.05 | 1.00 | 0.95 |

TABLE 1-continued

Calibration values for RGB signals:k [s] [t]

| t | s | | |
|---|---|---|---|
| | R | G | B |
| M | 1.00 | 1.00 | 1.00 |
| Y | 1.00 | 1.00 | 0.95 |

Calibration data for the RGB signals shown in Table 1 is displayed, as shown in FIG. 19, on the display screen 305 of the operating section in the main body of the copying machine 101, and those numerical values can be inputted by pressing down with a finger the corresponding section in the display area. Inputted data is stored in the RAM 417.

By using the values in the expressions (9), (10), the values v[t][i](r[t][i], g[t][i], b[t][i]) (t=Y, M, C, or K, i=0, 1, . . . 9) read by the scanner 401 are calibrated as follows. Herein, description is made for a case of t=C (Cyan). RGB elements in the read values for cyan toner are calibrated as follows:
Expression 10

$$r1[C][i] = r[C][0] - \Delta r[t][k] \times k[r][t]$$

$$g1[C][i] = g[C][0] - \Delta g[t][k] \times k[g][t]$$

$$b1[C][i] = b[C][0] - \Delta b[t][k] \times k[b][t]$$

and, the calibrated values are set to new values (r[t][i], g[t][i], b[t][i]), and are used as follows.

Next description is made for a method of generating a gradation conversion table (LUT) executed in the γ calibrating circuit 410 as a γ conversion processing section when ACC is executed.

In the read values for a pattern v[t][i](r[t][i], g[t][i], b[t][i]), image signals for each complementary color of YMC toner are b[t][i], g[t][i], r[t][i] respectively, so that only image signals for complementary colors are used. Herein, to make the description below simple, a[t][i](i=0, 1, . . . 9; t=C, M, Y, or K) is used to be shown. A gradation conversion table is prepared, which makes the processing simple. It should be noted that, even if any image signal of RGB is used, sufficient precision can be obtained as far as black toner is concerned, however, a G (green) element is used.

The reference data is given by a set of values v0[t][i](r0[t][i], g0[t][i], b0[t][i]) read by the scanner 401 and the corresponding write values LD[i](i=1, 2, . . . 10) by a laser. Similarly, to make the description below simple, by using only complementary color image signals for YMC, the following expression is described:
Expression 11

$$A[t][n[i]](0 \leq n[i] \leq 255, i=1, 2, \ldots, 10, t=Y, M, C, \text{ or } K)$$

A YMCK gradation conversion table can be obtained by comparing the a[LD] described above to the reference data A[n] stored in the ROM 416. Herein, n indicates an input value to the YMCK gradation conversion table, and the reference data A[n] indicates a target value for a read image signal that the YMC toner pattern outputted at a laser write value LD[i] after the input value [n] is subjected to YMCK gradation conversion is read by a scanner. It should be noted that the reference data A[n] has two type of reference data, one of which is one for executing calibration according to an image density enabling output by a printer, and the other of which is one for not executing calibration. Determination is made as to whether calibration is executed or not according to the data for determination, described later, previously stored in the ROM 416 or the RAM 417. This calibration is described later.

By obtaining LD corresponding to A[n] from the a[LD] described above, laser output values LD[n] corresponding to input values n to a YMCK gradation conversion table is computed. By computing laser output values with input values i=0, 1, 2, . . . 255 (when it is 8 bits of signal), a gradation conversion table can be obtained.

When it is operated, in place of the above processing to all the input values n=00h, 01h, . . . FFh (hexadecimal) to the YMCK gradation conversion table, the processing is executed only to some of the values like n[i]=0, 11h, 22h, . . . FFh by skipping some therebetween, and for values other than the above values, interpolation is executed by using a spline function or the like, or a table closest to the sets of (0, LD[0], [11h, LD[11h]]), (22h, LD[22h]]), . . . , (FFh, LD[FFh]]) each obtained by the above processing among the YMCK γ-calibration tables previously stored in the ROM 16 is selected.

Figure 16:
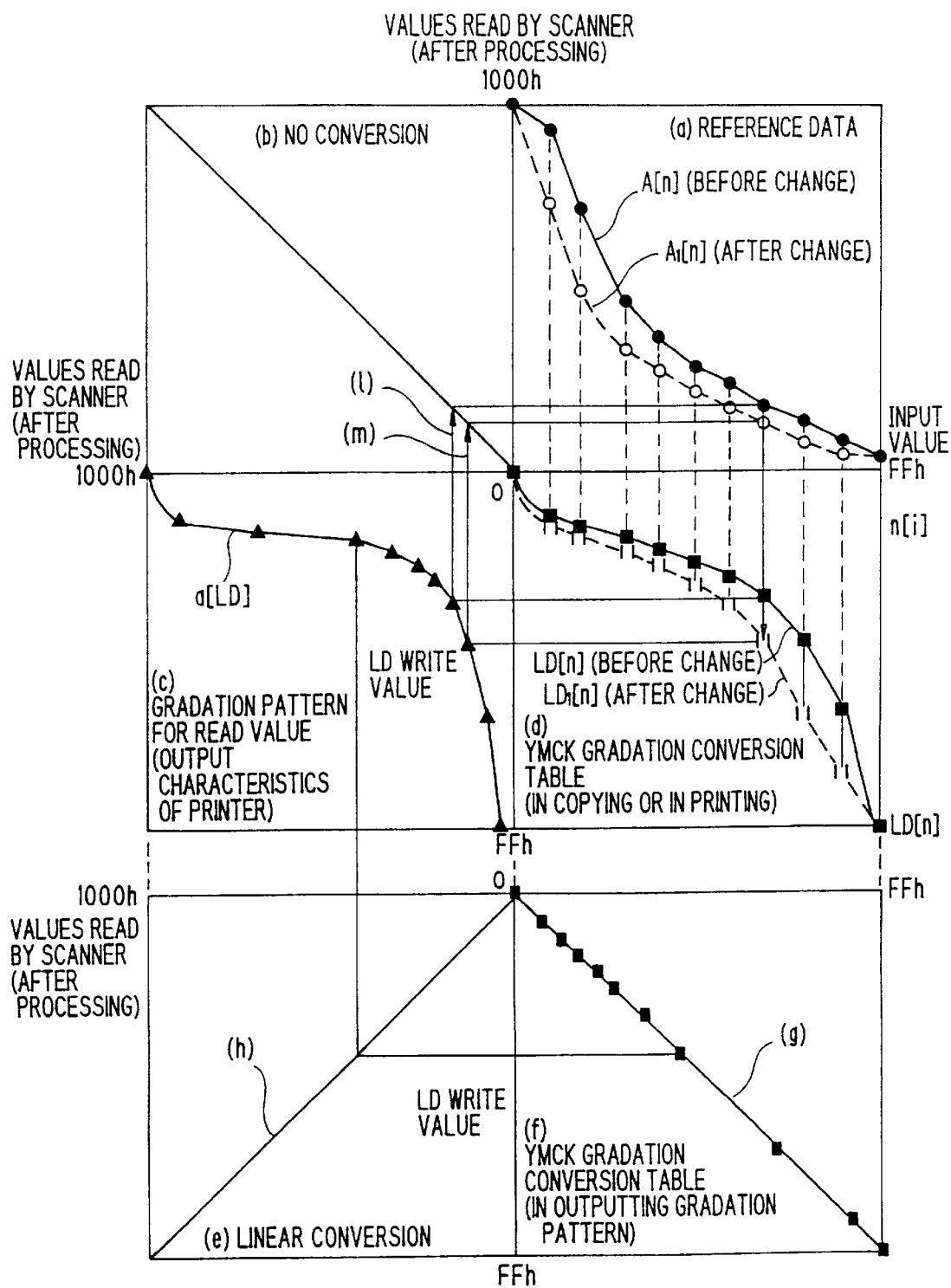
FIG. 16 is a graph for explanation of calibration of a background color.

Description is made for the above processing with reference to the graph shown in FIG. 16. FIG. 16 is a graph for explanation of calibration of a background color. The X-axis in the upper right quadrant (a) of FIG. 16 indicates an input value n to the YMCMK gradation conversion table and the Y-axis therein indicates a value (after the processing) read by the scanner 401, which indicates the reference data A[1] described above. The value (after the processing) read by the scanner 401 is a value, in contrast to a value obtained by reading a gradation pattern by the scanner 401, obtained by RGB γ-converting (conversion is not executed here), averaging and adding the read data in some points of the gradation pattern, and the obtained value is processed herein as 12 bits of data to improve operational precision. The X-axis in the upper left quadrant (b) thereof indicates a value (after the processing) read by the scanner 401 like in the Y-axis. The Y-axis in the lower left quadrant (c) indicates a written value by a laser beam (LD). This data a[LD] indicates characteristics of a printer. The write value by a laser beam (LD) for actually formed pattern includes 16 values in total such as 00h (a background color), 11h, 22h, . . . , EEh, FFh, which indicate values by skipping therebetween, however, values not detected between the detected points are interpolated herein, so that the graph is regarded as a continuous graph. The graph in the lower right quadrant (d) thereof indicates a YMCK gradation conversion table LD[1] which is an object to be obtained.

Values of the X-axis and Y-axis of the graph (f) are the same as those in the graph (d). In a case where a gradation pattern for detection is formed, the YMCK gradation conversion table (g) shown in the graph (f) is used. The X-axis of the last graph (e) is the same as that in the lower left quadrant (c), which indicates linear conversion for the convenience to show a relation between the write values of LD when a gradation patter is prepared and values read by the scanner 401 (after the processing). The reference data A[n] corresponding to an input value n is obtained from the graph shown in FIG. 16, and LD output LD[n] to obtain A[n] is obtained along the arrow (1) in the figure using the read value a[LD] for the gradation pattern.

Figure 17:
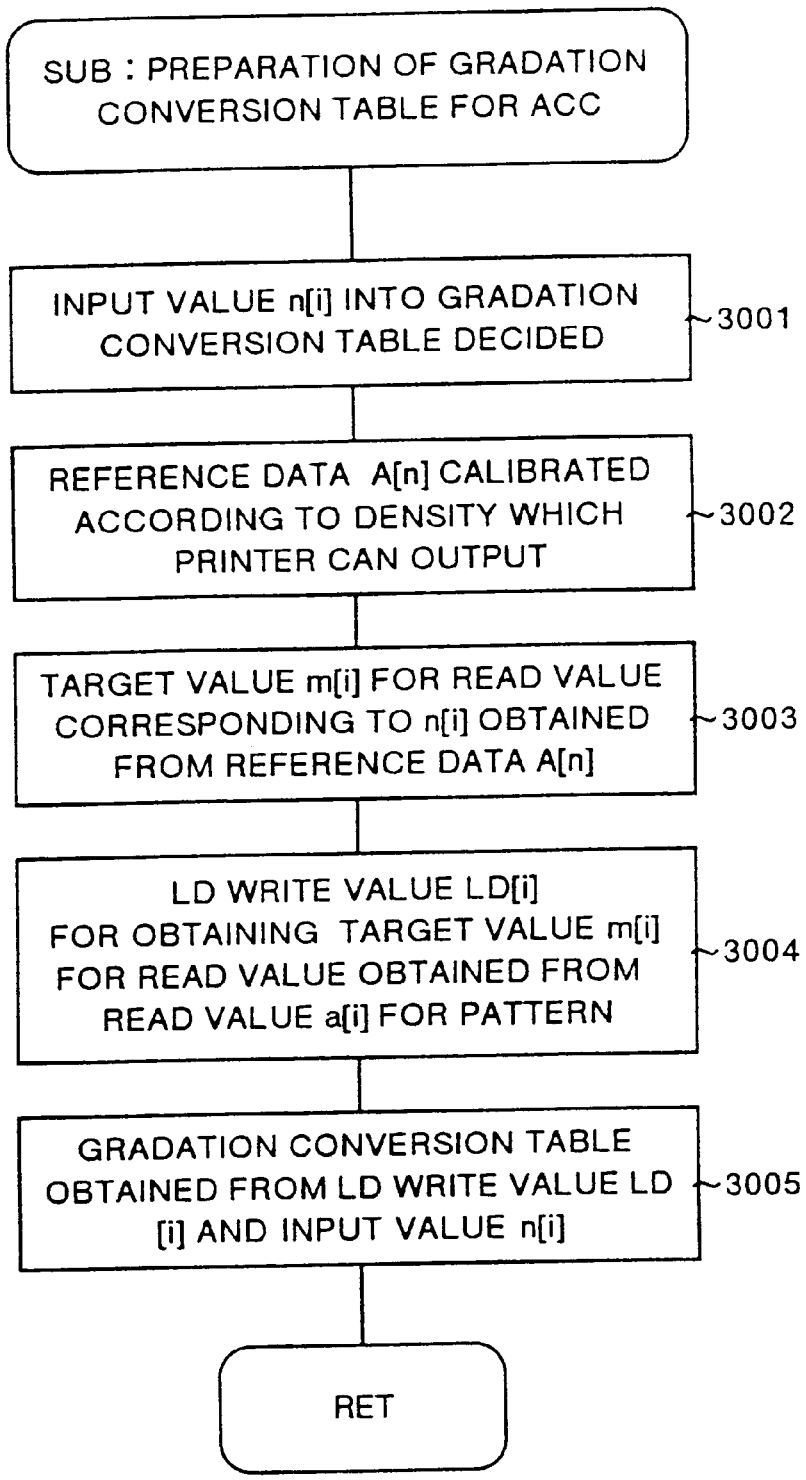
FIG. 17 is a flow chart showing a sequence of preparing a gradation conversion table when the ACC is performed.

Next description is made for a sequence of operation with reference to FIG. 17. FIG. 17 is a flowchart showing a sequence of preparing a gradation conversion table when the ACC is executed.

At first, input values required for obtaining a YMCK γ-calibration table are computed (step 3001). Herein, it is assumed that n[1] is set to the following values: n[i]=11 [h] xi (i=0, 1, . . . , imax=15). Then, the reference data A[n] is calibrated according to an image density in which an image can be outputted onto a printer 412 (step 3002). Herein, it is assumed that read values by a laser in which the maximum image density enabling preparation by the printer 412 can be obtained is set to FFh (indicated by hexadecimal) and the read value m[FFh]for a pattern at this time is set to mmax. It is assumed that the reference data A[i](i=0, 1, . . . , i1) is one with which calibration is not executed over the area from the side of a low image density to the side of an intermediate image density, the reference data A[i](i=i2+1, . . . , i max) (i2≧i1, i2≦i max−1) is one with which calibration is not executed in the side of a high image density, and the reference data A[i](i=i1+1, . . . , i2) is one with which calibration is executed therein.

In an example described below. Description is made for concrete method of computing assuming that a signal is an image signal to which RGB γ-conversion is not executed and which is proportional alto a reflection factor of a document. Of the reference data with which calibration is not executed, a difference Δref between the data is computed from the reference data A[i2+1] with the lowest image density in a high image density section as well as from the reference data A[i1] with the lowest image density in a low image density section.

Namely, it is assumed as follows:

$$\Delta ref = A[i1] - A[i2+1] \tag{11}$$

On the other hand, in a case of a reflection factor linear or a brightness linear in which RGB γ-conversion as reverse processing is not executed, Δref is larger than 0 (Δref>0). Similarly, a difference Δdet is computed from the read value mmax for a pattern with which the maximum image density enabling preparation by the printer 412 can be obtained. Namely, it is assumed as follows:

$$\Delta det = A[i1] - mmax \tag{12}$$

From the expressions (11) and (12), it is assumed that the reference data A[i](i=i1+1, . . . , i2) with which calibration is executed in a high density section is set to that as follows:

$$A[i] = A[i1] + (A[i] - A[i1]) \times (\Delta det/\Delta ref) \quad (i=i1+1, i1+2, \ldots, i2-1, i2) \tag{13}$$

Then, the read image signal m[i] by the scanner 401 corresponding to the n[i] obtained in step 3001 is obtained from the reference data A[n] (step 3003). Actually, the reference data, corresponding to values n[i] indicating not all the values to be detected, A[n[j]] (0≦n[j]265, j=0, 1, . . . , j max, n[j]≦n[k] for j≦k) is made as follows. Namely, j [0≦j≦j max] to be n[j]≦n[i]<n[j+1] is computed.

In a case of 8 bits of image signal, if the reference data is previously obtained as n [0]=0, n[j max]=255, n[j max+1]= n[j max]+1, A[j max+1]=A[j max], the computation becomes easier.

As far as a space in the reference data is concerned, a space of n[j] as small as possible is better because high precision of the γ-calibration table finally obtained can be achieved.

A value m[i] is obtained from the following expression using the value j computed as described above:

$$m[i] = A[j] + (A[j+1] - A[j]) \cdot (n[i] - n[j])/(n[j+1] - n[j]) \tag{14}$$

Herein, values are interpolated with a linear expression, however, interpolation may be executed thereto with a higher function or a spline function or the like. In that case, m[i] is obtained as follows:

$m[i]=f(n[i])$

Also, in a case of a k-th function, an expression is made as follows:
Expression 17

$$f(x) = \sum_{i=0}^{k} b_i x_i$$

Then, write values LD[i] by LD to obtain m[i] computed in step 3003 is obtained according to the same sequence as that in step 3003 (step 3004).

Namely, in a case where image signal data which is not subjected to RGB γ-conversion is processed, a value of a[LD] is smaller as a value of LD is larger. Namely, the expression is as follows:
In contrast to LD[k]<LD[k+1], $a[LD[k]] \geq a[LD[k+1]]$ Herein, it is assumed that values when a pattern is formed are set to 10 values such as LD[k]=00h, 11h, 22h, . . . , 66h, 88h, AAh, FFh, (k=0, 1, . . . , 9). That is because spaces between write values LD [k] for a pattern are narrow since fluctuation of read values by the scanner 401 to a quantity of deposited toner is large in an image density with small quantity of deposited toner, and because spaces therebetween are widened for reading since fluctuation of read values by the scanner 401 to a quantity of deposited toner is small in an image density with large quantity of deposited toner.

As some merits provided by the above processing, a pattern is formed with the write values by LD as described above because consumption of toner can be reduced as compared to a case where the number of patterns is increased such as LD[k]=00h, 11h, 22h, . . . , EEh, FFh (16 in total) or the like, fluctuation to write values by LD is small in a high image density area, and a narrow space between write values by LD is not always effective to improve the precision thereof because read values are easily reversed due to influence of a non-uniform potential on the photosensitive body, non-uniform deposited toner thereon, and a non-uniform potential on toner or the like thereover.

Herein, the following expression is obtained:
To LD[k] satisfying the condition of $a[LD[k+1]] \geq m[i] > a[LD[k+1]], LD[i]=LD[k]+(LD[k+1]-LD[k]) \cdot (m[i]-a[LD[k]])/(a[LD[k+1]]-a[LD[k]])$ When the expression is set to $0 \leq k \leq k$ max [k max>0], and in a case of a[LD[k max]]>m[i] (in a case of a high image density in the target value obtained from the reference data), $LD[i]=LD[k]+(LD[kmax]-LD[kmax-1]) \cdot (m[i]-a[LD[kmax-1]])/(a[LD[kmax]]-a[LD[kmas-1]])$ the above expression is made, and a pattern is estimated by extrapolation with a linear expression.

With this processing, a set [n[i], LD[i]] (i=0, 1, . . . , 15) of input values n[i] to a YMCK γ-calibration table and output values LD[i] is obtained.

Then, based on the obtained values [n[i], LD[i]] (i=0, 1, . . . , 15), interpolation is executed with a spline function, or the γ-calibration table stored in the ROM 416 is selected (step 3005).

Figure 18:
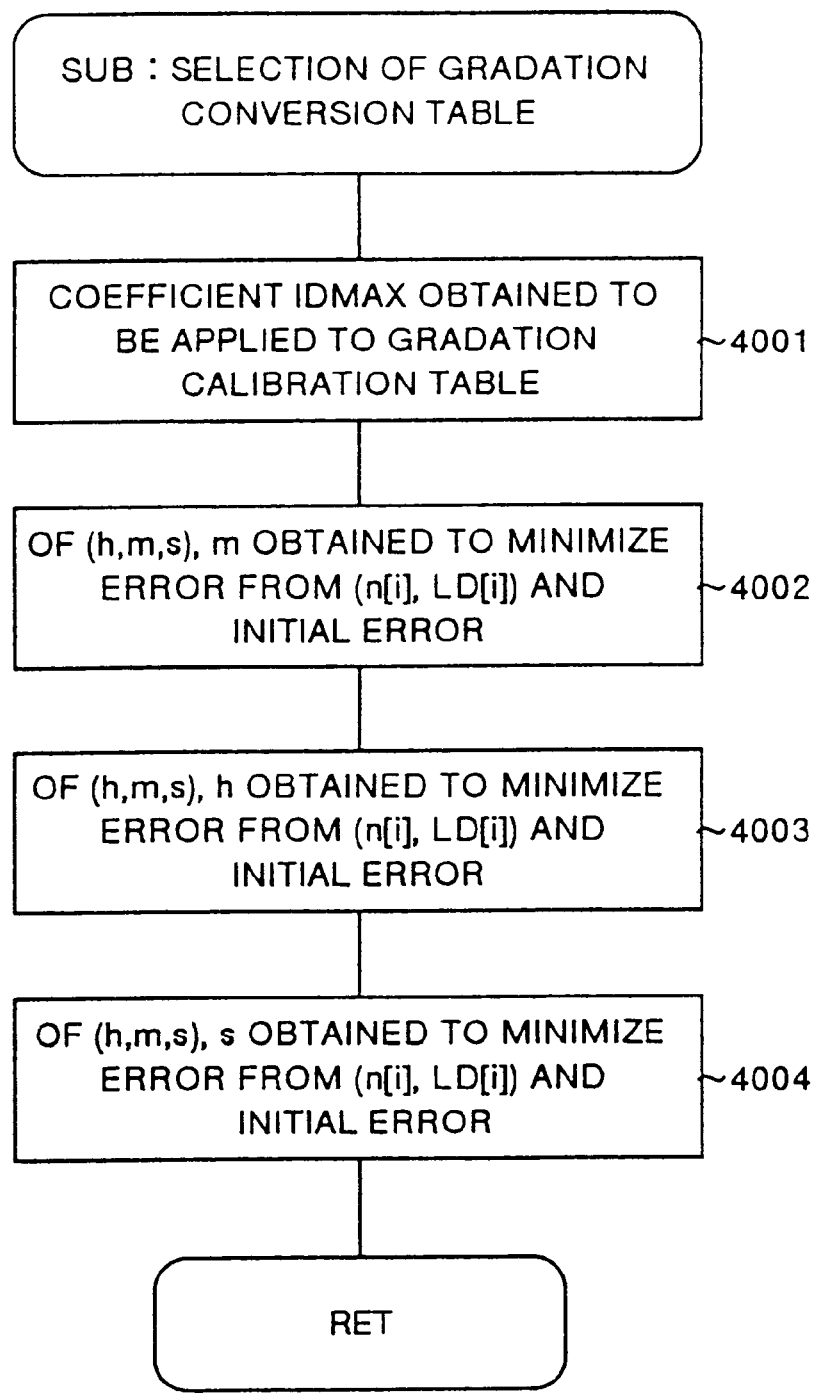
FIG. 18 is a flow chart showing a sequence of selecting a gradation conversion table when the ACC is performed.

Next, a method of selecting a γ-calibration table is described in relation to preparation of the calibrated gradation curve described above with reference to FIG. 18. FIG. 18 is a flowchart showing a sequence for selecting a gradation conversion table during execution of ACC.

At first, coefficient IDMAX [%] applied to the entire γ-calibration table (step S4001) is computed. Herein in a case of n [imax]=FFh, IDMAX is set to LD[imax]/FFh×100 [%]. Also herein an output value LD[i] to the YMCK γ-calibration table is rewritten assuming LD'[i]=LD[i]×100/IDMAX. With the operations, there is no necessity to take into considerations the IDMAX in selection of a γ-calibration table.

Then curvature h, and s, which are indices for curved section of the whole section, highlight section, and shadowed section respectively, are selected. For that purpose, at first, the curvature m for the whole section is selected (step S4002). Basically m is selected so that a sum of square of errors between the finally obtained gradation conversion curve E[j] ($0 \leq j \leq 255$) and a set (n[i], LD[i]) ($0 \leq i \leq 15$) of the input value n[i] into the YMCK γ-calibration table and the output value LD[i] (described as error hereinafter) will be minimum, $error=\Sigma wi \cdot (LD[i]-E[n[i]])^2$ wherein wi is weight to an input value to the i-th YMCK γ calibration table. In this step, if an error for the highlight section is large, a desired result can not be obtained, so that the weight wi for the highlight section is made larger to make the error as small as possible.

Similarly, curvature h for a highlight section which should have a minimum error is obtained (step S4003), and then curvature s for a shadowed error which should also have a minimum error is obtained (step S4004). The (h_min, m_min, s_min) obtained as described above and IDMAX are used as new curvature of the calibrated gradation curve.

Figure 20:
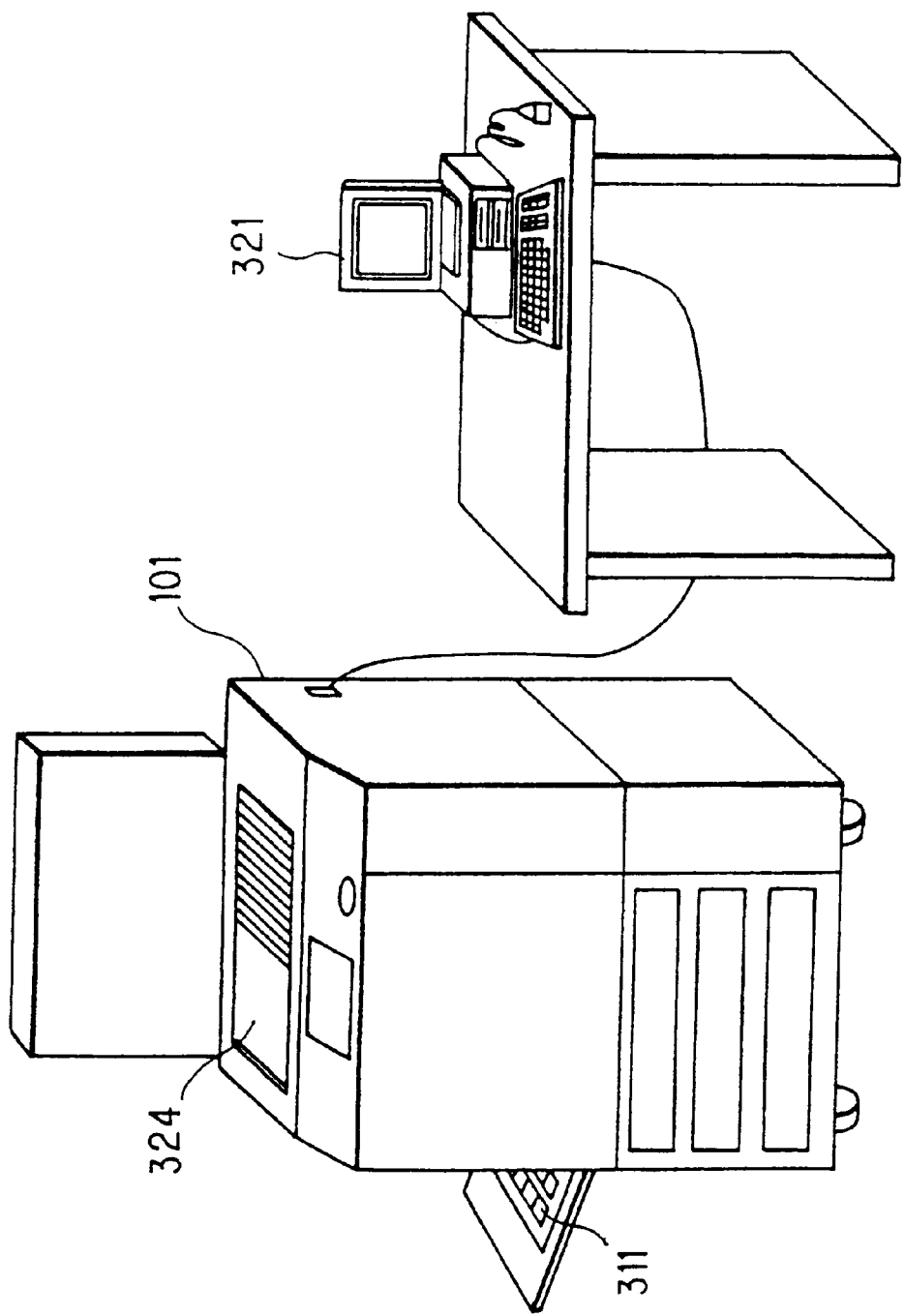
FIG. 20 is a schematic view showing an example of configuration for setting and inputting calibration values for RGB signals.
Figure 21:
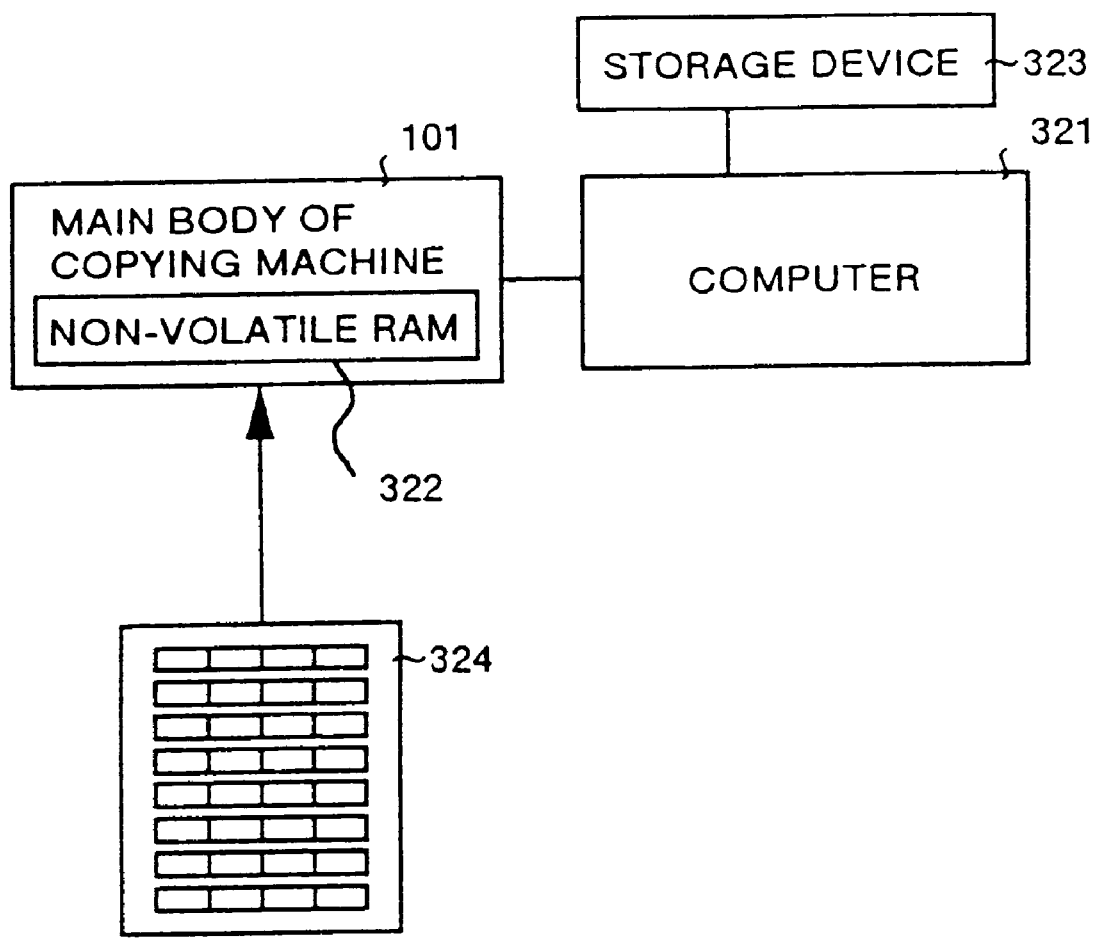
FIG. 21 is a block diagram showing electric configuration of the view shown in FIG. 20.
Figure 22:
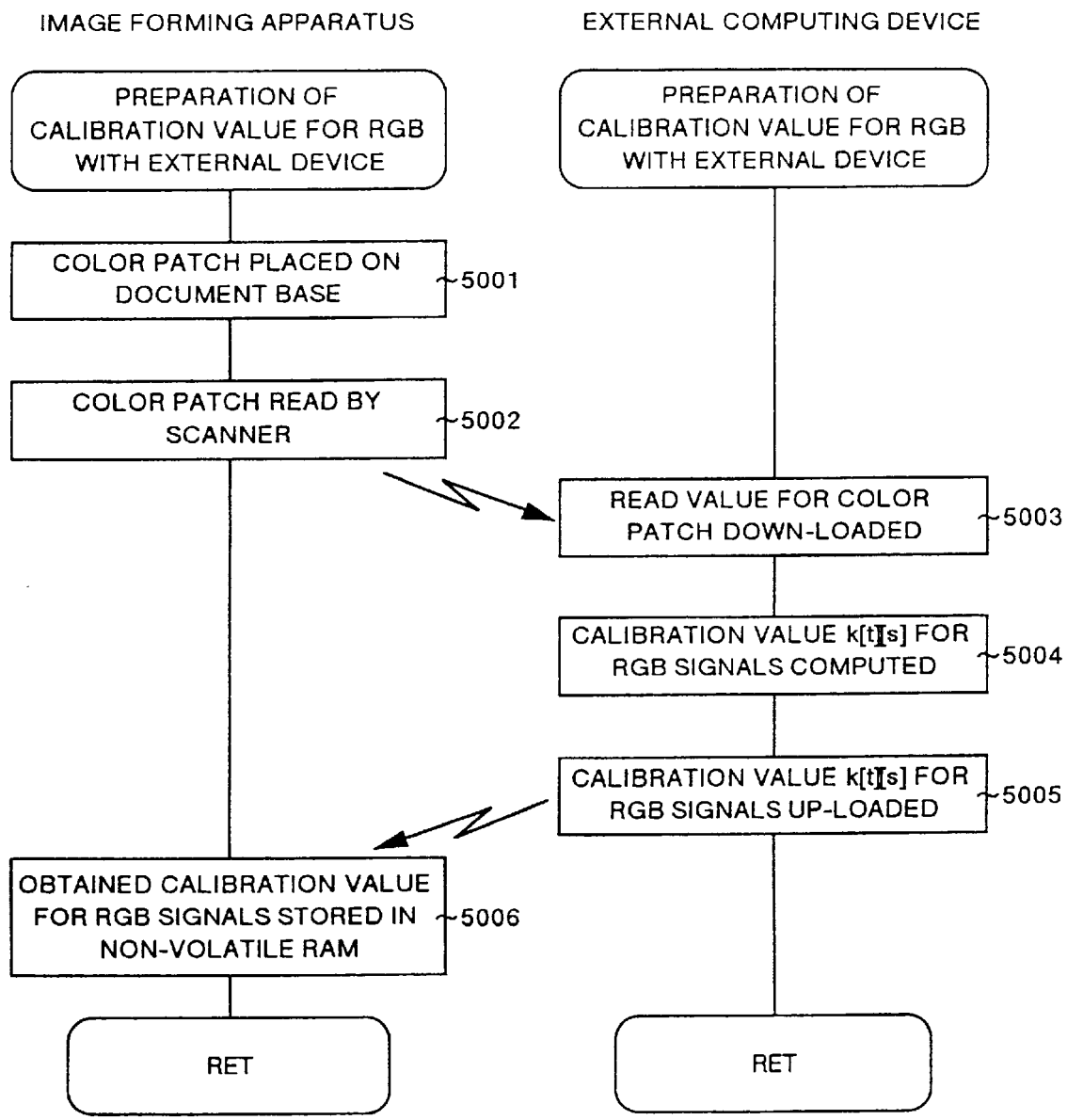
FIG. 22 is a flow chart showing a sequence of preparation for setting and inputting calibration values for RGB signals.
Figure 23:
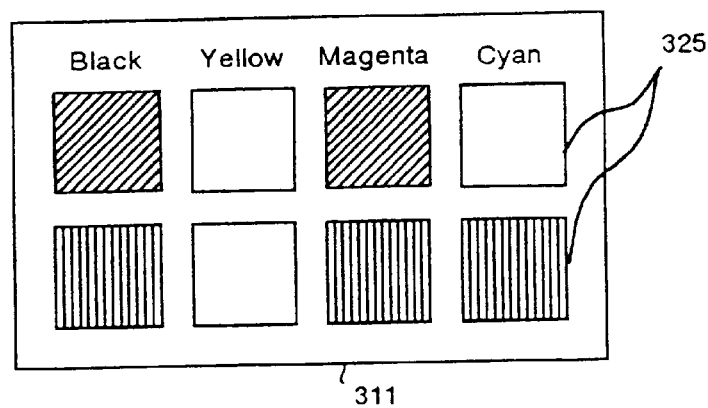
FIG. 23 is a plan view showing an example of a color patch transferred onto transfer paper.

Next description is made for a method of setting a calibration value for RGB signals with an external device and a particular example of input data from the device with reference to FIG. 20 through FIG. 23. FIG. 20 is a general block diagram showing an example of configuration for setting and inputting calibration values for RGB signals; FIG. 21 is a block diagram showing electric configuration of the system shown in FIG. 20; FIG. 22 is a flow chart showing a sequence for setting and inputting calibration values for RGB signals in a form according to the second embodiment of the present invention; and FIG. 23 is a flat view showing an example of color patch transferred onto transfer paper.

As shown in FIG. 20, a computer 321, which is a computing device for computing calibration values for RGB signals, is connected with a wired communication means to the main body of copying machine 101 so that bi-directional communication can be made. The computer 321 comprises a computer for control which can also process data. It should be noted that the main body of copying machine 101 and the computer 321 may be connected to each other with a radio communicating means. Copying machine 101 is arranged to accept a YMCK color patch 324 and discharge a transfer paper 311, as described hereinafter.

As shown by the block diagram in FIG. 21, the main body of copying machine 101 has a non-volatile RAM 322, and reads color patch having a known spectral reflection characteristic. A memory device 323 is connected to the computer 321.

To describe a sequence for preparing calibration values for RGB signals with the devices with reference to the flowchart shown in FIG. 22, a YMCK color patch 324 having a known spectral reflection characteristics is placed on a contact glass 118 of the main body of the copying machine (step S5001). The color patch 324 comprises a color patch printed with YMCK ink or the like when transferred onto transfer paper 311 as shown in FIG. 23. FIG. 23 shows two types of color tone for each of YMCK, but the color tone may be one type. Then with the scanner 401 of the main body of the copying machine 101, the color patch 324 is read, and read values for RGB signals are obtained (step S5002). The read values for this color patch 324 are down-loaded to a computer 321 which is an external computing device (step S5003).

The read values V[t][s](t=W, Y, M, C, or K: s=R, G, or B) for RGB signals for the color patch 324 down-loaded to the computer 321 are compared to the read values v0[t][s] (t=Y, M, C, or K: s=R, G, or B) for RGB signals read with a CCD having a standard spectral characteristic, and a ratio k[t][s] (t=Y, M, C, or K: s=R, G, or B) for each is obtained (step S5004). It should be noted that this computing may be executed in the side of the main body of the copying machine 101. Then calibration values for RGB signals obtained from the computer 321 are up-loaded to the main body of the copying machine 101 (step S5005), and the main body of the copying machine 101 stores the obtained calibration values for RGB signals in the non-volatile RAM 322 (step S5006).

Calibration values for RGB signals are prepared with the computer 321 as described above, and the calibration values are transferred to the main body of the copying machine 101 and stored in the non-volatile RAM 322 in the main body of the copying machine 101. The calibration values for RGB signals stored in the non-volatile RAM 322 are transferred to the CPU 130 just after power for the main body of the copying machine 101 is turned ON, and are stored in the RAM 132 of the CPU 130. The calibration value for RGB signals stored in the RAM 132 of the CPU 130 are used in execution of the ACC described above.

The processing is executed as described below.

$$\Delta v[t][s] = v[W][s] - v[t][s] \tag{15}$$

$$\Delta v0[t][s] = v0[W][s] - v0[t][s] \tag{16}$$

$$k[t][s] = \Delta v0[t][s]/\Delta v[t][s] \tag{17}$$

Herein t=w is a read value for white as a standard. It should be noted that the value may be for white of the transfer paper 311, or may be an ideal white such as $\Delta v[t][s]$ for an 8-bit signal if spectral reflection characteristic is known.

Figure 24:
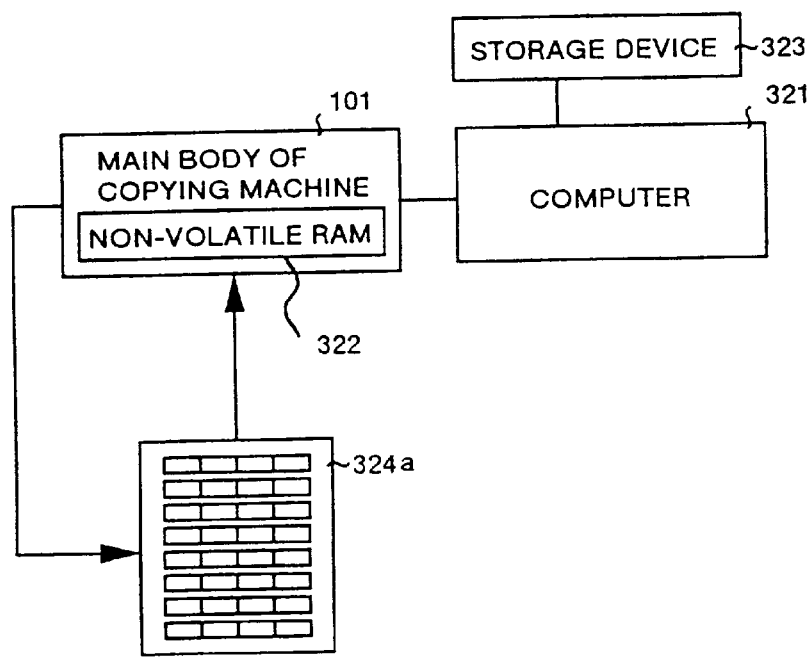
FIG. 24 is a block diagram showing another example for setting and inputting calibration values for RGB signals.
Figure 25:
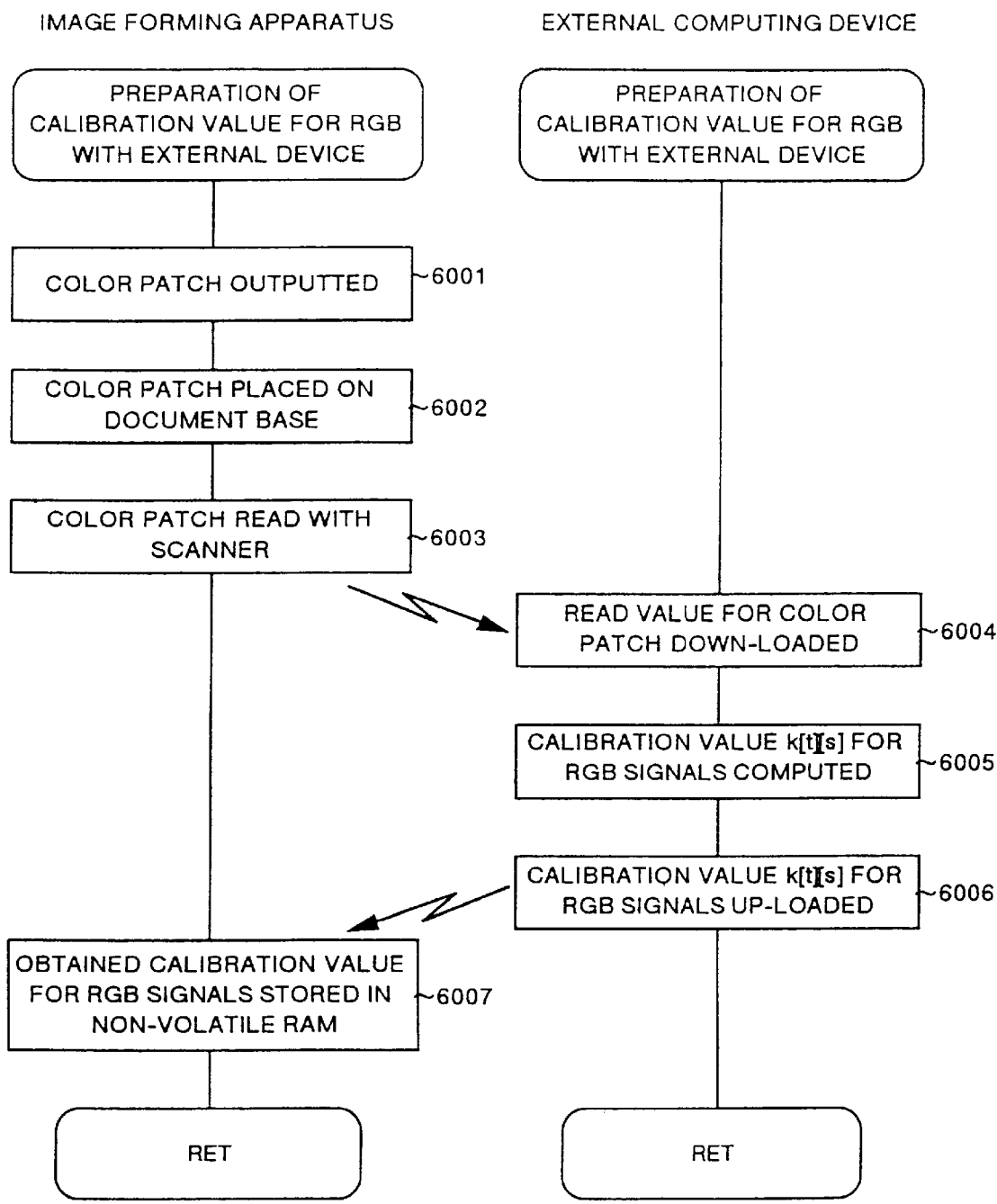
FIG. 25 is a flow chart showing a sequence of preparation for setting and inputting calibration values for RGB signals in FIG. 24.

In the example described above, the color patch 324 painted with ink or the like was used, but printed-out a toner patch outputted from the main body of the copying machine 101 may be used. Description is made for this case with reference to FIG. 24 and FIG. 25. FIG. 24 is a block diagram showing another example of setting and inputting calibration values for RGB signals, and FIG. 25 is a flowchart showing a sequence for setting and inputting calibration values for RGB signals in FIG. 24.

As shown in FIG. 24, in this example, the configuration is the same as that shown in FIG. 21 excluding the point that a toner patch 324a is obtained from the main body of the copying machine 101, so that duplicated description is omitted herein. Also in the flow chart in FIG. 25 showing a sequence for preparation, the sequence from step S6002 to step S6007 is completely the same as a sequence from step S5001 to step 5006 in FIG. 22 excluding the step 6001 for placing the color patch 324 on the contact glass 118 of the basic body of the copying machine 101, so that also description of the steps is omitted herein.

To know the spectral reflection characteristic, the spectral reflection characteristic ρ(t, λ) (wavelength λ [n m], t=W, Y, M, C, or B) is measured using the spectrographic color measure or the like, and at the same time it may be computed from the spectral transmission characteristic τ [s, λ](s=R, G, or B) of a standard CCD as well as from the spectral characteristic E0(λ) for a standard light source through the following expression.

$$\Delta v0[t][s] = A\, E0(\lambda)\rho(t, \lambda)\tau 0(s, \lambda)d\lambda \tag{18}$$

wherein A is a proportional al constant, and λ is a wavelength.

Figure 26:
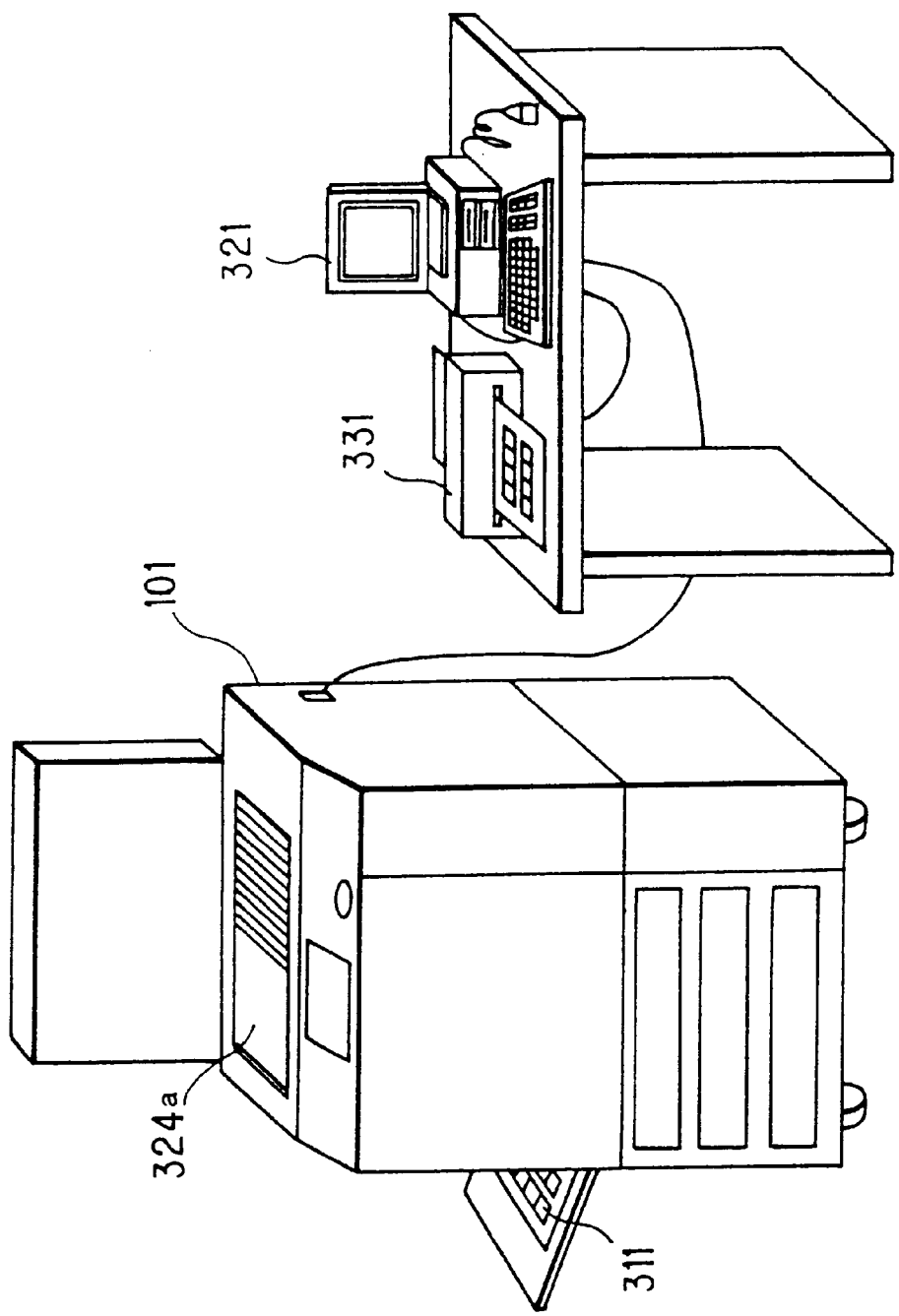
FIG. 26 is a schematic view showing another further example for setting and inputting calibration values for RGB signals.
Figure 27:
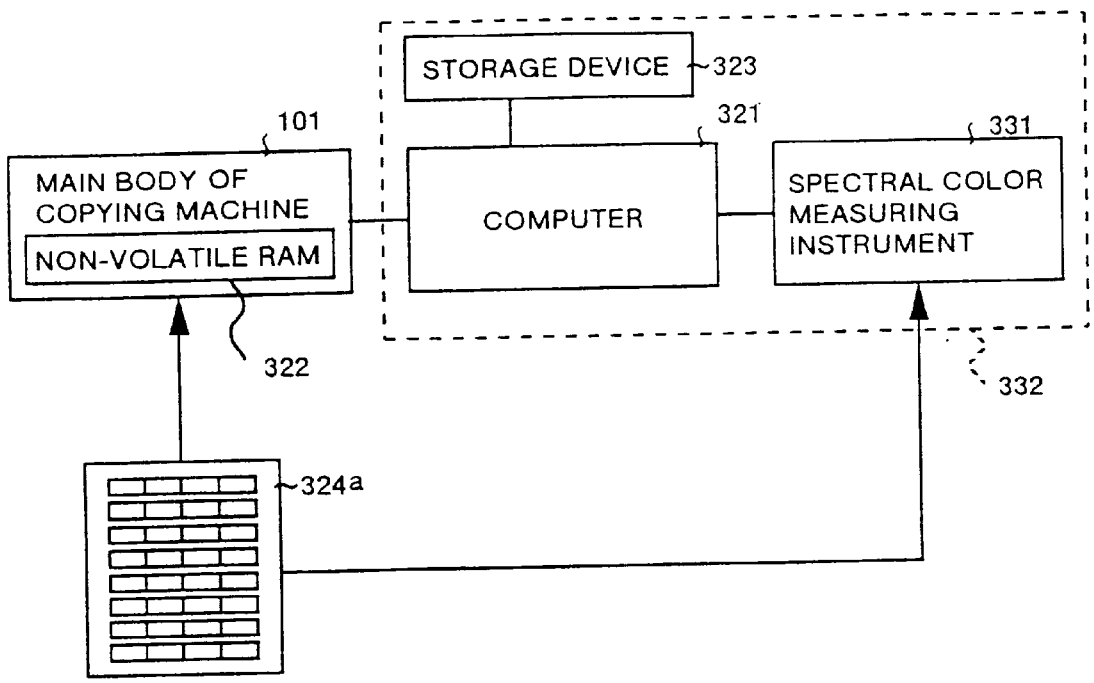
FIG. 27 is a block diagram showing electric configuration of the view shown in FIG. 26.
Figure 28:
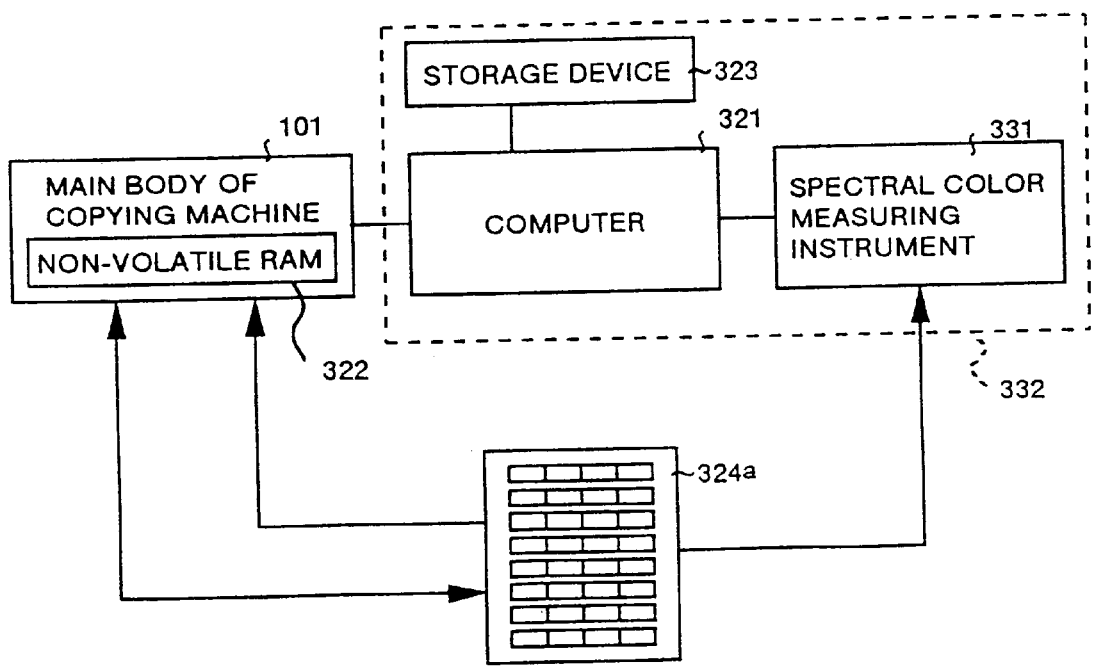
FIG. 28 is a block diagram showing electric configuration in a case where a toner patch is used in the configuration shown in FIG. 26.
Figure 29:
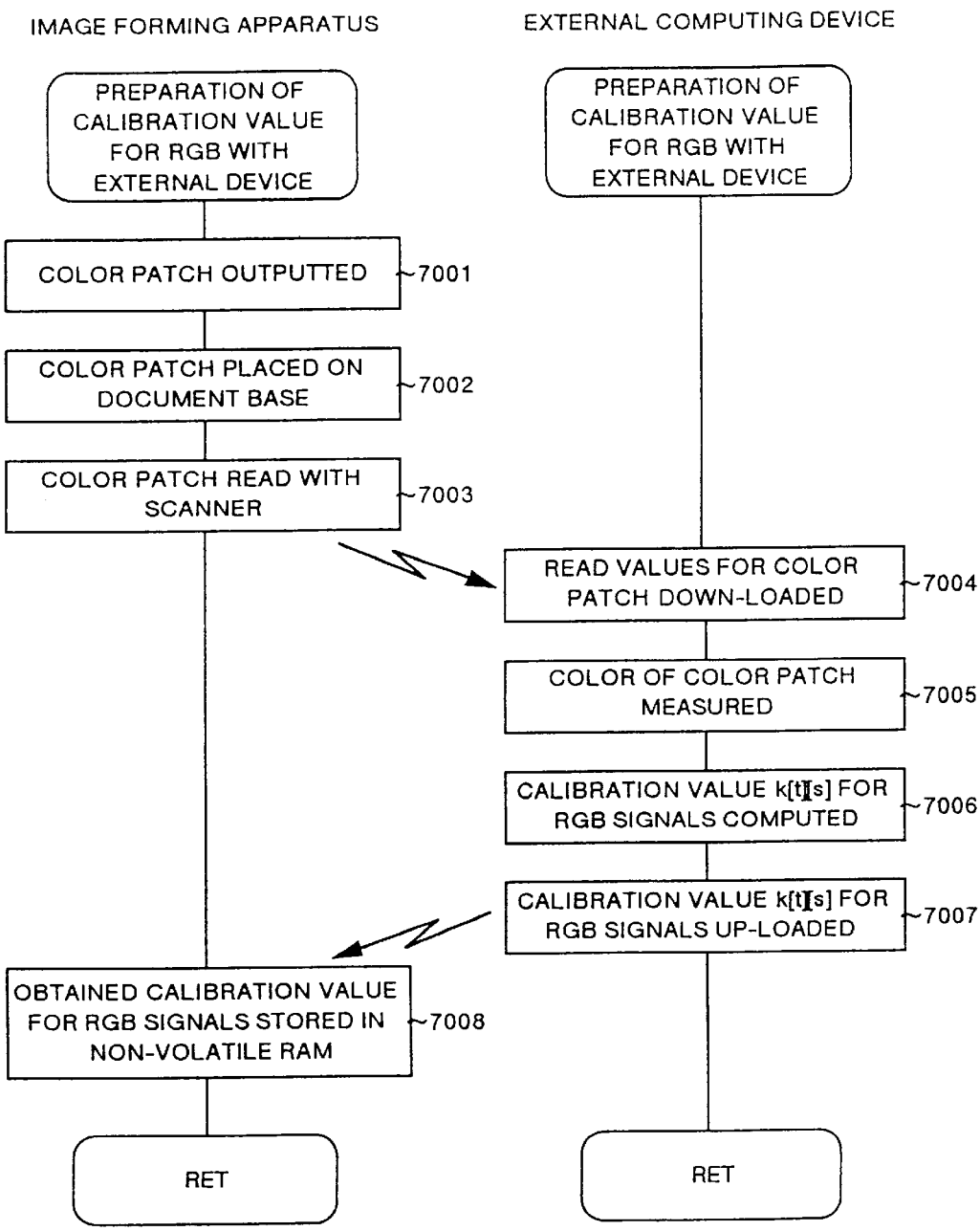
FIG. 29 is a flow chart showing a sequence of preparation for setting and inputting calibration values for RGB signals in the configuration shown in FIG. 27 and FIG. 28.

Next description is made for still another example of a case where calibration values for RGB signals are computed using the expression (18) with reference to FIG. 26 and FIG. 29. FIG. 26 is a general block diagram showing still another example of configuration for setting and inputting calibration values for RGB signals; FIG. 27 is a block diagram showing electric configuration of the system shown in FIG. 26; FIG. 28 is a block diagram showing electric configuration of a case where a color patch prepared with toner in the configuration shown in FIG. 26 is used; and FIG. 29 is a flow chart showing a sequence for setting and inputting calibration values for RGB signals in FIG. 27 and FIG. 28.

The configuration shown in FIG. 26 are the same as that shown in FIG. 20 excluding the point that a spectrographic color measuring instrument 331 is connected to the computer 321. Also in the block diagram shown in FIG. 27, the image density adjustor 332 comprises a computer 321, a storage device 323, and the spectrographic color measuring instrument 331. Further, in a case where a toner patch 324a prepared with toner is used as a color patch, a toner patch 324a is prepared with the main body of the copying machine 101, so that the blocks as shown in FIG. 28 are provided.

To describe a sequence for preparing calibration values for RGB signals with the configuration as described above with reference to the flowchart shown in FIG. 29, at first a color patch is outputted (step S7001). Then the YMCK color patch having a known spectral reflection characteristic is placed on the contact glass 118 of the document base of the main body of the copying machine 101 (step S7002). Then, with the color scanner 401 of the main body of the copying machine 101, the color patch is read to obtain read values for RGB signals (step S7003). On the other hand, in the computer 321 which is an external computing device, read values for the color patch from the main body of the copying machine 101 is down-loaded (step S7004), and the outputted color patch outputted from the main body of the copying machine 101 is read with the spectrographic color measuring instrument 331 (step S7005).

Then, read values for RGB v0[t][s] (t=W, Y, M, C, or K:s=R, G, or B) when read with a CCD having a standard spectral characteristic are computed from the read values v[t][s] (t=W, Y, M, C, or K: s=R, G, or B) for RGB of the color patch down-loaded into the computer 321 as well as a result of measurement of a spectral reflection factor through the expression (18), and a ratio k[t][s] (t=W, Y, M, C, or K: s=R, G, or B) for each of RGB is obtained (step 7006). Then the calibration values for RGB signals obtained from the computer 321 are up-loaded to the main body of the copying machine 101 (step 7007) and are stored in the non-volatile RAM 322 in the main body of the copying machine 101 (step 7008).

Figure 30:
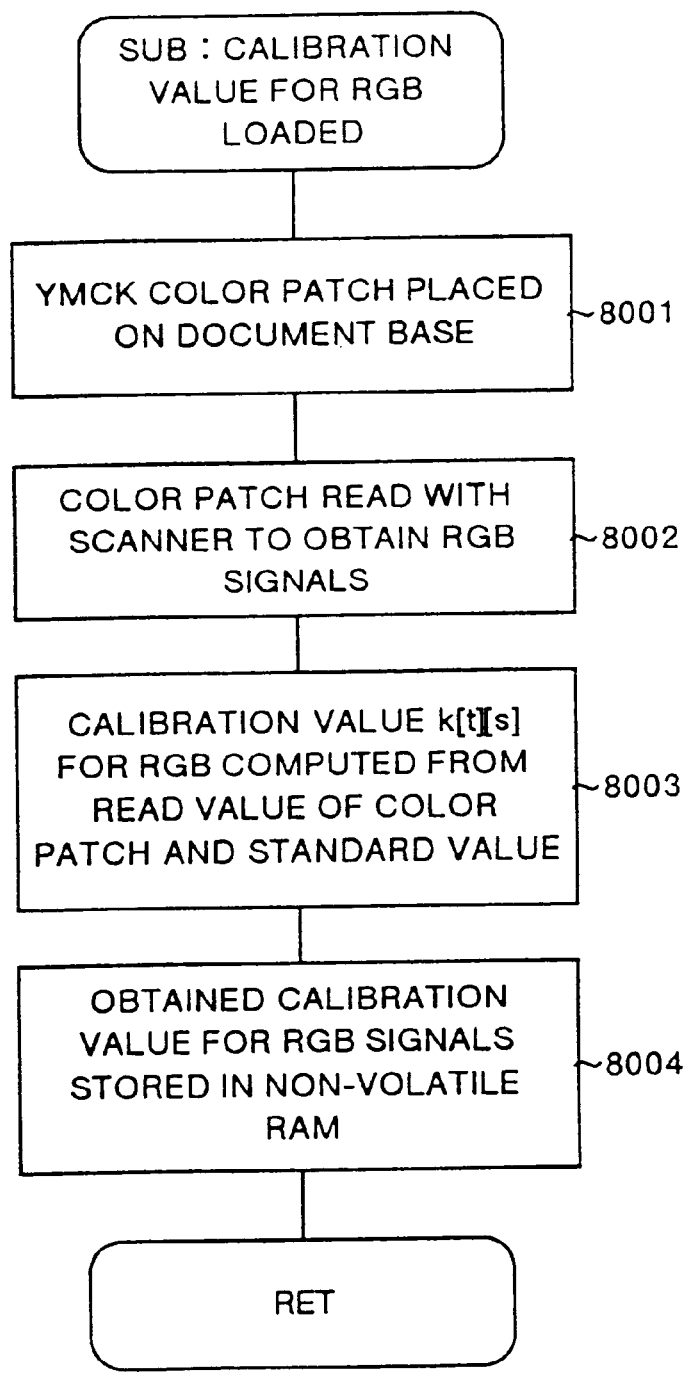
FIG. 30 is a flow chart showing another further sequence of a case where calibration values for RGB signals are computed.

Although the computer 321 is used as an external device in the example described above, the processing through the expression (17) may be executed by previously storing the values for the expression (16) in the non-volatile RAM 322 or ROM 416 of the main body of the copying machine 101. Description is made below for the sequence in this case with reference to the flowchart shown in FIG. 30. Namely, the YMCK gradation pattern (color patch) is placed on the contact glass 118 of a document base of the main body of the copying machine 101 (step S8001), and the color patch is read with the color scanner 401 of the main body of the copying machine 101 to obtain read values for RGB signals (step 8002). Then read value v[t][s] (t=W, Y, M, C, or K: s=R, G, or B) for RGB of the color patch are compared to the read value v0[t][s] (t=W, Y, M, C or K: S=R, G, or B) for RGB when read with a CCD having a standard spectral characteristic and previously stored therein, and a ration k[t][s] (t=W, Y, M, C, or K: s=R, G, or B) for each is obtained (step 8003). Then the calibration values for RGB signals obtained as described above are stored in the non-volatile RAM 322 in the main body of the copying machine 101 (step 8004).

It should be noted that, in a case where a printer controller is connected to use the image forming apparatus as a printer, when outputting data from the host computer connected to the printer controller, or by preparing a command for setting the calibration values in a printer set command, the calibration values for RGB may be set. Also in a case where a memory card can be used, the calibration values may be stored in the memory card so that the calibration values can be read out when the image forming apparatus is used.

In the first embodiment described above, an image signal conversion table is prepared and selected according to read values read for a gradation pattern, but also an image signal conversion table is prepared and selected according to read signals read for gradation patterns formed on a transfer member as well as to reference data (gradation target data) corresponding to read signals for gradation patterns stored in a storing means. Description is made for the embodiment below. It should be noted that, in the second embodiment, the same reference numerals are assigned to sections corresponding to those in the first embodiment, and description thereof is omitted herein.

The reference data consists of input values n into a gradation conversion table (n=0, 1, 2, ..., 255) and target values for values read by a scanner 401 (r[t][i], g[t][i], b[t][i]), and the reference data is expressed as follows:

$$Ar[t][n](0 \leq n \leq 255, t=Y, M, C, \text{ or } K)$$

$$Ag[t][n](0 \leq n \leq 255, t=Y, M, C, \text{ or } K)$$

$$Ab[t][n](0 \leq n \leq 255, t=Y, M, C, \text{ or } K) \quad (19)$$

Herein Ar, Ag, and Ab are reference data for a red signal, a green signal, and a blue signal respectively, while YMCK indicates a color of toner.

The above expression (19) indicates that a probable input value into a gradation conversion table, namely reference data corresponding to any of 256 values from 0 to 255 are stored on a memory with the processing for 8-bit signal. By storing reference data consisting of 256 values as described above, the processing described later can be simplified, but to save a memory space required for storing the reference data, by storing the following set with the reference data obtained through the expression (19) and corresponding to several value of n[i] (in this case, 16 types of value) with n[0]=0, n[i]=26×i−5 (i=1, 2, ..., 10) as an example thereof:

$$n[i](0 \leq n \leq 255, i=0, 1, \ldots, 10)$$

$$Ar[t][n[i]](0 \leq n \leq 255, i=0, 1, \ldots, 10\ t=Y, M, C, \text{ or } K)$$

$$Ag[t][n[i]](0 \leq n \leq 255, i=0, 1, \ldots, 10\ t=Y, M, C, \text{ or } K)$$

$$Ab[t][n[i]](0 \leq n \leq 255, i=0, 1, \ldots, 10\ t=Y, M, C, \text{ or } K)$$

and reference data Ar[t][n[i]] corresponding to n (n=1 to 20 in the above case) other than n[i] (i=0, 1, 2, ..., 10) may be computed by interpolation as described below. As one of the examples, the value may be computed by means of interpolation using reference data Ar, g, b[t][n[i]], Ar, g, b[t][n[i+1]] corresponding to n[i]≦n≦n[i+1] (for n=1 to 20, i=0, n[0]=0, n[1]=21).

On the other hand, in a RAM 417, percentages of RGB components in the reference data for read values for the patterns are stored as indicated by the expression (10). K[s][t] in the expression (10) takes a value close to 1. However, as indicated by the Expression 9, inside a copying machine, the value is stored as integral number data. A value of k[s][t] obtained as described above which is a calibration value for the RGB signals is like that as shown in Table 1 above.

The calibration data for the RGB signals shown in Table 1 is, as shown in FIG. 19, displayed on a display screen 305 of an operating section of the main body of the copying machine 101, and the numerical values can be inputted by pressing a section corresponding to a section to be displayed with a finger. The inputted data is stored in the RAM 417.

As one of the examples, description is made below for a case of t=c (cyan). GGB components of the reference data for cyan toner are calibrated as follows:

$$Ar[C][n[i]]=Ar[W]+(Ar[C][n[i]]-Ar[W])\times k[r][C]$$

$$Ag[C][n[i]]=Ag[W]+(Ag[C][n[i]]-Ag[W])\times k[g][C]$$

$$Ab[C][n[i]]=Ab[W]+(Ab[C][n[i]]-Ab[W])\times k[b][C] \quad (21)$$

It should be noted that i=0, 1, 2, ..., 10 in the expression (21) above. Herein (Ar[C][n[i], Agl[C][n[i], Abl[C][n[i]) indicates RGB components in reference data after calibration, and (Ar[C][n[i]], Ag[C][n[i]], Ab[C][n[i]] indicates reference data before calibration. Also Ar[W], Ag[W], and Ab[W] are RGB signals when a white color (the brightest color to the scanner 401 to be used) is read respectively. In a case where a red value is an 8-bit signal, this value is in a range from 0 to 25, and value 0 indicates the darkest image density, namely a quantity of light detected by a CCD in the scanner 401 when an object with a low reflection factor or a low transmission factor is read, and value 255 indicates the brightest image density, namely a quantity of light detected by a CCD in the scanner 401 when an object with a high reflection factor or a high transmission factor is read.

It should be noted that each value may be set as follows in practical operation, although the precision becomes somewhat lower:

$$Ar[W]=Ar[C][0]$$

$$Ag[W]=Ag[C][0]$$

$$Ab[W]=Ab[C][0]$$

Herein, Ar[C][0], Ag[C][0], and Ab[C][0] are values obtained when the background color section of the paper is read. It should be noted that, when reading a background color section of paper, it is possible to prevent the precision from becoming lower by setting several sheets of white paper to make up so-called the white back so that the backing for the paper will not become dark.

As another example, in a case of t=C (cyan), practically the processing can be executed by setting each value as follows:

$$Ar1[C][n[i]] = Ar[W] + (Ar[C][n[i]] \times k[r])[C] \quad (22)$$

$$Ag1[C][n[i]] = Ag[W] + (Ag[C][n[i]] \times k[g])[C]$$

$$Ab1[C][n[i]] = Ab[W] + (Ab[C][n[i]] - Ab[W]) \times k[b])[C]$$

Herein, i in the expression (22) is in a range from 0 to 10. However, in a case of i=0, n[0], namely in a case where an input value into the gradation conversion table is 0 (zero), calibration by the expression (22) should not be performed. The values of k[r][C], k[g][C], and k[b][C] used in the expression (22) are not equal to the values of k[r][C], k[g][C], and k[b][C] used in the expression (21), and it is necessary to change the numerical values to appropriate ones for each expression. To simplify the processing, the (Ar[C][n[i]], Ag1[C][n[i]], Ab1[C][n[i]]) is modified to (Ar[t][n[i]], Ag[t][n[i]], Ab[t][n[i]]) and is used in the processing described below.

Next, description is made for a sequence for producing a gradation conversion table (LUT) executed during execution of ACC in a γ-calibrating circuit 410 which is a γ-conversion processing section.

Image signals for complementary colors for YMC toners are blue, green, and red respectively, and to simplify the processing, of the reference data Ar[t][i], Ag[t][i], and Ab[t][i], the reference data Ab[t][i], Ag[t][i], and Ar[t][i] for complementary colors for the toners are used. This treatment is effective in a case where the spectral (reflection) characteristic of used toner does not change largely, namely in a case where the color taste does not change. Herein to simplify the description, the following expression is used:

$$A[t][n[i]](0 \leq n[i] \leq 255, i=0, 1, \ldots, 10; t=C, M, Y)$$

For black toner, adequate preciseness is obtained by using either one of the RGB image signals, but therein the G (green) component is used.

Similarly, also the read signal is expressed using only an image signal for the complementary color as follows:

$$a[t][i](i=0, 1, \ldots, 9; t=C, M, Y, K)$$

Furthermore reference data A[t][i] for toner t for a certain color (t=C, M, Y, K) and a written value a[t][i] for a laser beam (LD) are expressed as A[i] and a[t][i] in abbreviated forms respectively.

Figure 31:
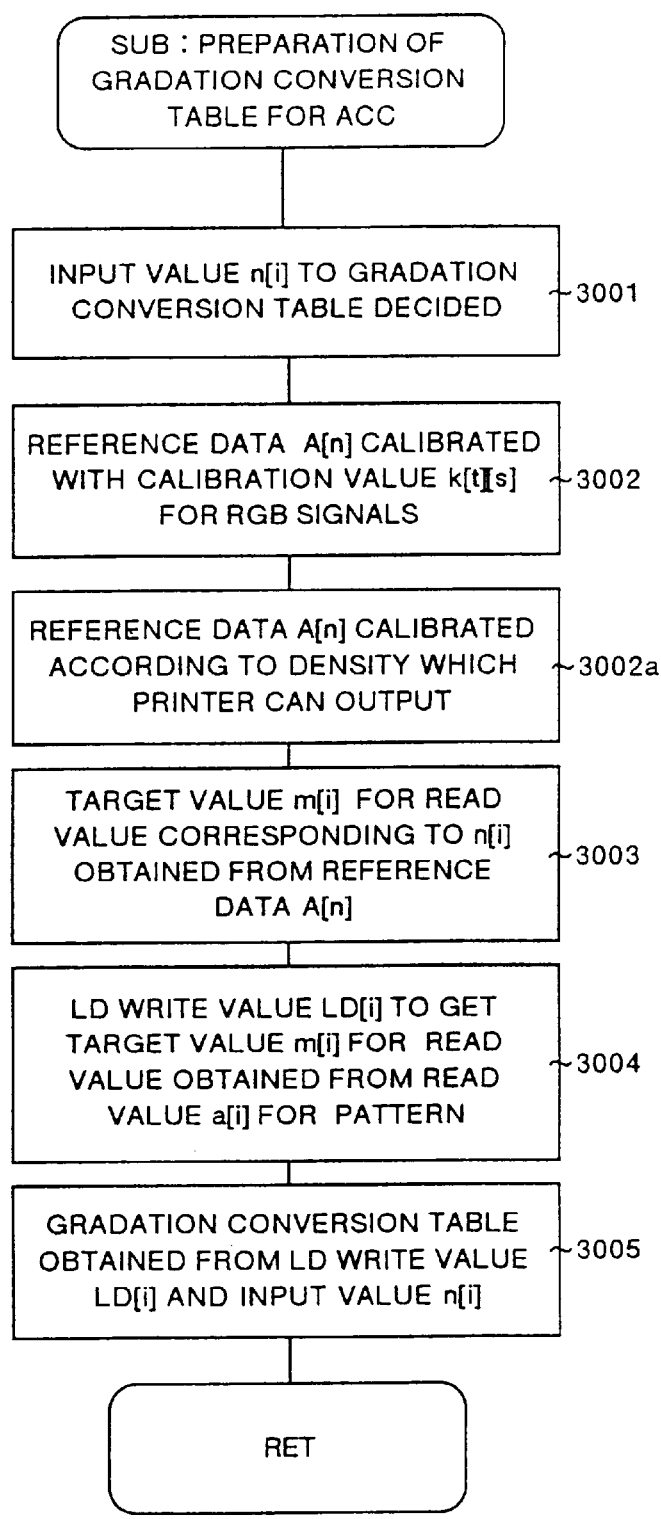
FIG. 31 is a flow chart showing a sequence of preparing a gradation conversion table when the ACC is performed.
Figure 32:
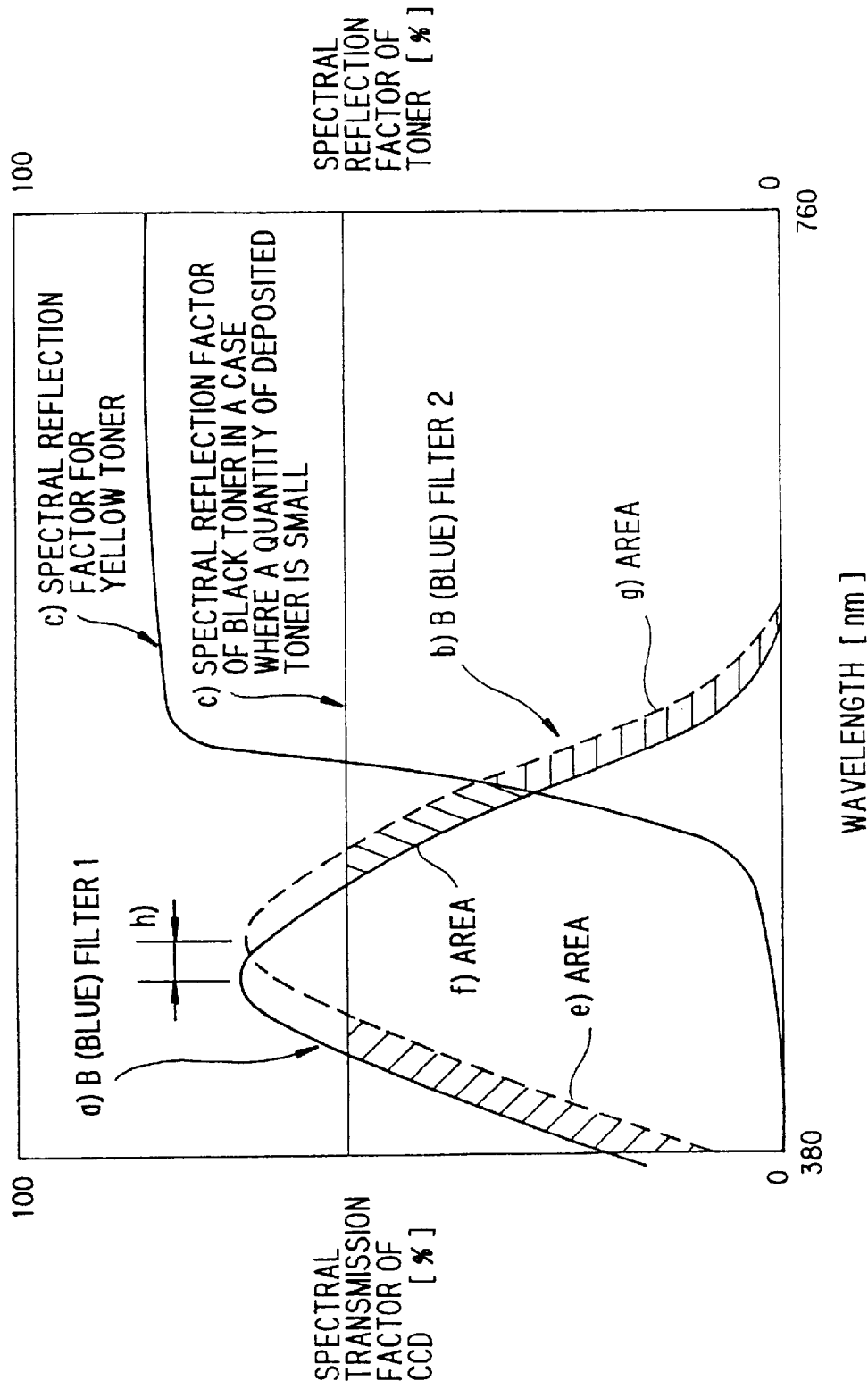
FIG. 32 is a graph showing dispersion of spectral transmission characteristics in a blue filter of a CCD based on the conventional technology.

Next description is made for a computing sequence with reference to FIG. 31. FIG. 31 is a flowchart showing a sequence for preparing a gradation conversion table in execution of ACC.

At first, an input value required for preparation of a YMCK γ-calibration table is computed (step S3001). Herein it is assumed that n[i]=11[h]×i (i=0, 1, ..., imax=15). Then, the reference data A[n] is calibrated with a calibration value k[s][t] for RGB signal according to the sequence described above (step S3002). Then the reference data A[n] is calibrated according to an image density which can be outputted from the printer 412 (step 3002*a*). Herein, it is assumed that a read value for a laser bean which makes it possible to obtain the maximum image density obtainable with the printer 412 is FFh (displayed in a form of hexadecimal form), and also that the read value m [FFh] for the pattern then is mmax. Also it is assumed that reference data not calibrated in a range from the low image density to the intermediate image density is A[i] (i=0, 1, ..., i1); reference data not calibrated in the high image density side is A[i] (i=i2+1, ..., imax-1) (i2≧i1, i2≦imax-10, and reference data to be calibrated in the area is A[i](i=i1+1, ..., i2).

Next description is made for a concrete computing method assuming an image signal not subjected to RGB γ-conversion which is proportional to a reflection factor of the document. Of the reference data not subjected to calibration, the difference Δref is computed from the reference data A[i2+1] with the lowest image density in the high image density section as well as from the reference data A[i1] with the lowest image density in the low image density section.

Namely, the following expression is applicable:

$$\Delta ref = A[i1] - A[i2+1] \quad (23)$$

On the other hand, in a case of reflection factor linear or a brightness linear not requiring RGB γ-conversion which is a process for inversion, the Δref is larger than 0. Also the different Δdet is computed from the read value mmax for the pattern with the maximum image density obtainable with the printer 412. Namely the following expression is applicable:

$$\Delta det = A[i1] - mmax \quad (24)$$

From the expressions (14) and (15) above, the reference data A[i] (i=i1+1, ..., i2) having been subjected to calibration of the high density section is:

$$A[i] = A[i1] + (A[i] - A[i1] \times (\Delta det/\Delta ref))\ (i=i1, i1+2, \ldots, i2-1, i2) \quad (25)$$

Then an image signal n[i] read by the scanner 401 corresponding to n[i] obtained in step 3001 is obtained from the reference data A[n] (step 3003). Actually, the reference data A (n[j] (0≦n[j] 255, j=0, 1, ..., jmax, n[j]≦n[k] for i≦k) corresponding to discrete n[j] is set as follows. Namely, j (0≦j≦jmax) for n[j]≦n[i]<n[j+1] is obtained.

In a case of an 8-bit image signal, by obtaining reference data assuming that n[0]=0, n[jmax]=255, n[jmax+1]=n [jmax]+1, and A[jmax+1]=A[jmax], the computing is simplified.

Also, the smaller the gap n[j] in the reference data is, the higher a degree of preciseness of the finally obtained γ-calibration is.

A target value m[i] is obtained from j obtained as described above through the following expression:

$$m[i] = A[j] + A[j] + (A[j+1] - A[i]) \cdot (n[i] - n[j])/(n[i+1] - n[i]) \quad (26)$$

Herein, interpolation is performed with a linear expression, but interpolation may be formed with a high-order function or a spline function. In that case, $$m[i] = f(n[i])$$

Also in a case of a the k-th function, the Expression 17 described above may be used.

Then a written value LD[i] for LD to obtain the target value m[i] obtained in step S3003 is obtained through a sequence similar to that in step 3003 (step 3004).

Namely, when image signal data not having been subjected to RGB γ-conversion is processed, as a value of LD becomes larger, a value of a [LD] becomes smaller. In other words, in contrast to $$LD[k] < LD(k+1)$$

the following expression is applicable:

$$a[LD[k]] \geq a[LD[k+1]]$$

Herein an LD value when a pattern is formed can take 10 values of LD [k]=00h, 11h, 22h, ..., 66h, 88h, AAh, FFh.

(k=0, 1, . . . , 9). This type of setting is employed because, as values for a quantity of deposited toner read by the scanner 401 largely changes in an area with image density corresponding to a small quantity of deposited toner, gap between written value LD[k] for a pattern is made smaller to read the area, and also as values for a quantity of deposited toner read by the scanner 401 little changes in an area with image density corresponding to a large quantity of deposited area, the gap be made larger to read the area.

The merits provided by forming a pattern with LD read values as described above are that, as compared to a case where the number of patterns is increased as indicated by LD[k]=00h, 11h, 22h, . . . , EEh, FFh (16 patterns in total), a consumption rate of toner can be suppressed, and that LD written values little change in a high image density area, and the scheme as described above is employed because, as read values easily changes due to non-uniformity in potential on a photosensitive body, non-uniformity in deposition of toner, and also non-uniformity in potential on toner, making smaller a gap between LD written values is not always effective for improve the preciseness.

Herein to LD [k] satisfying the following expression:

$$a[LD[k]] \geq m[i] > a[LD[k+1]]$$

the following expression is applied:

$$LD[i]=LD[k]+(LD[k+1]-LD[k]) \cdot (m[i]-a[LD[k]])/(aLD[k+1]-a[LD[k]])$$

In a case of $0 \leq k \leq k\max$ ($k\max>0$), if a[LD[kmax]] is larger than m[i] (if image density for a target value obtained from the reference data is high), the following expression is used:

$$LD[i]=LD[k]+(LD[k\max]-LD[k\max-1]) \cdot (m[i]-a[LD[k\max-1]])/(aLD[k\max]-a[LD[k\max-1]])$$

and estimation is made by performing by extrapolation with a linear function. In addition to use of a linear function, other methods such as use of logarithm may be employed for extrapolation.

With this a set (n[i], LD[i]) (i=0, 1, . . . , 15) of an input value n[i] into a YMCK γ-calibration table and an output value LD[i] can be obtained.

And according to the obtained (n[i], LD[i]) (i=0, 1, . . . , 15) interpolation is performed with a spline function or the like, or a γ-calibration table in the ROM 416 is selected (step 3005).

Sections, operations and processes not specifically described herein are the same as those in the first embodiment.

As understood from the description above, with an image forming apparatus according to the present invention, it is possible to correct spectral sensitivity of an image reading means varying unit by unit and to obtain a gradation calibration table for obtaining good gradations. Also it is possible to prepare a YMCK gradation calibration table for obtaining good color balance in a color image forming apparatus.

With an image forming apparatus according to the present invention, in a case where spectral (transmission) characteristics changes due to change of an image reading means during passage of time, or even in a case where spectral (transmission) characteristic of toner being used changes, it is possible to always obtain a correct value by setting a ratio between a plurality of signal read values each having different spectral sensitivity.

With an image forming apparatus according to the present invention; a service man or a user can easily obtain a desired image by freely changing a calibration value previously set in an operating section of an image forming apparatus.

With an image forming apparatus according to the present invention, when non-uniformity of spectral sensitivity of an image forming means which will vary from unit to unit can be calibrated in the assembly step by inputting a value for calibration from the device provided outside the image forming apparatus, and with this feature a calibration value can easily be set in each image forming apparatus.

With an image forming apparatus according to the present invention, even in a case where characteristics of a machine changes during passage of time or a color characteristic of toner changes, an appropriate value can easily be set as a calibration value according to the change, and a serviceman or a user can set an appropriate calibration value with simple operations.

With an image forming apparatus according to the present invention, it is possible to correct spectral sensitivity of an image reading means which varies unit by unit and also to prepare a YMCK gradation calibration table for obtaining good color balance and gradations by executing ACC.

With an image forming apparatus according to the present invention, in a case where spectral (transmission) characteristic of an image reading means changes during passage of time, or in a case where spectral (reflection) characteristic of toner being used changes, a ratio between RGB read values for YMCK toner being used for the image reading means can be inputted according to the necessity, and a read value for YMCK toner can always be calibrated to an appropriate value.

With an image forming apparatus according to the present invention, a serviceman or a user can input an appropriate calibration value into an operating section of an image forming apparatus, so that a gradation calibration table for obtaining good color balance and gradations can be obtained by executing ACC.

With an image forming apparatus according to the present invention, data for calibrating non-uniformity in spectral sensitivity of an image reading means which varies for each image forming apparatus can be prepared or set with a device provided outside the image forming apparatus in the assembly step, so that data can rapidly be set in the image forming apparatus.

With an image forming apparatus according to the present invention, even if machine characteristic changes during passage of time or color characteristic of toner changes, it is possible to have an appropriate value stored as a calibration value according to the change, and a gradation calibration table for obtaining good color balance and gradations can be obtained by executing ACC.

This application is based on Japanese patent application Nos. HEI 8-296542, HEI 8-116723 and HEI 9-109257 filed in the Japanese Patent Office on Nov. 8, 1996, May 10, 1996 and Apr. 25, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
   a reading means for optically scanning and reading a document image;
   a means for converting an input image signal from said reading means to an output image signal by referring an image signal conversion table, and outputting the converted signal;

a writing means for writing image information on an image carrier according to said output image signal;

a means for transfer the image on said image carrier onto a transfer member to form the image;

a means for generating a plurality of gradation patterns; and a means for updating and selecting an image signal conversion table according to read values obtained by reading the gradation patterns generated and transferred by said generating means onto transfer paper with said reading means for reading an image; wherein a read signal for said gradation patterns comprises a plurality of signals each having different spectral sensitivity, and a memory for storing therein calibration factors for said plurality of signals each having different spectral sensitivity is provided to correct the read signals for said gradation patterns according to said calibration factor from said memory.

2. An image forming apparatus according to claim 1 further comprising a means for setting a ratio between read values for said plurality of signals each having different spectral sensitivity.

3. An image forming apparatus according to claim 2; wherein said means for setting a ratio between read values sets the ratio between read values from read values for said patterns as well as from read values for a plurality of signals previously stored therein.

4. An image forming apparatus according to claim 2; wherein setting by said means for setting a ratio between read values is performed by inputting data from an operating section of the image forming apparatus.

5. An image forming apparatus according to claim 4; wherein said means for setting a ratio between read values sets the ratio between read values from read values for said patterns as well as from read values for a plurality of signals previously stored therein.

6. An image forming apparatus according to claim 2; wherein said means for setting a ratio between said read values is provided outside the image forming apparatus and inputs said ratio between read values into said image forming apparatus from the outside thereof.

7. An image forming apparatus according to claim 6; wherein said means for setting a ratio between read values sets the ratio between read values from read values for said patterns as well as from read values for a plurality of signals previously stored therein.

8. An image forming apparatus comprising:

a means for optically scanning and reading a document image;

a means for converting an input image signal from said reading means to an output image signal by referring to an image signal conversion table and outputting the converted signal;

a writing means for writing image information onto an image carrier according to said output image signal;

a means for transferring the image on said image carrier onto a transfer member to form the image;

a means for generating a plurality of gradation patterns; and a means for updating and selecting an image signal conversion table according to read signals for gradation patterns generated and formed on a transfer member by said generating means and read by said image reading means as well as to reference data which is gradation target data corresponding to the read signals for said gradation patterns stored in the storing means; wherein said reference data comprises a plurality of signals each having different spectral sensitivity, and said image forming apparatus has a memory for storing calibration factors for the plurality of signals each having different spectral sensitivity and a means for calibrating said reference data according to said calibration factors.

9. An image forming apparatus according to claim 8 further comprising a means for setting a ratio between said reference data having different spectral sensitivity respectively.

10. An image forming apparatus according to claim 9; wherein setting by said means for setting a ratio between reference data having spectral sensitivity is performed by inputting data from an operating section of the image forming apparatus.

11. An image forming apparatus according to claim 9; wherein said means for setting a ratio between reference data having different spectral sensitivity is provided outside the image forming apparatus and the reference data from said setting means is inputted into said image forming apparatus.

12. An image forming apparatus according claim 9; wherein said means for setting a ratio between reference data having different spectral sensitivity sets a ratio between read values from read values for said patterns as well as from read values for a plurality of signals previously stored therein.

* * * * *